US012089517B2

(12) United States Patent
Martin et al.

(10) Patent No.: US 12,089,517 B2
(45) Date of Patent: Sep. 17, 2024

(54) SYSTEM, METHOD, AND APPARATUS FOR PLANTER WEIGHT TRANSFER

(71) Applicant: Ronald Steve Martin, Elkton, KY (US)

(72) Inventors: Ronald Steve Martin, Elkton, KY (US); Robert R. Riley, Quality, KY (US)

(73) Assignee: Ronald Martin, Elkton, KY (US)

( * ) Notice: Subject to any disclaimer, the term of this patent is extended or adjusted under 35 U.S.C. 154(b) by 844 days.

(21) Appl. No.: 16/869,528

(22) Filed: May 7, 2020

(65) Prior Publication Data
US 2020/0383264 A1 Dec. 10, 2020

Related U.S. Application Data

(60) Provisional application No. 62/969,535, filed on Feb. 3, 2020, provisional application No. 62/844,377, filed on May 7, 2019.

(51) Int. Cl.
A01B 63/32 (2006.01)
A01B 63/00 (2006.01)
A01B 63/11 (2006.01)
A01C 7/20 (2006.01)

(52) U.S. Cl.
CPC ............ A01B 63/32 (2013.01); A01B 63/004 (2013.01); A01B 63/11 (2013.01); A01C 7/205 (2013.01)

(58) Field of Classification Search
CPC ....... A01B 63/008; A01B 63/10; A01B 63/11; A01B 63/145; A01B 63/32; A01B 63/73; A01B 63/004; A01B 73/044; A01C 7/205
See application file for complete search history.

(56) References Cited

U.S. PATENT DOCUMENTS

| | | | | |
|---|---|---|---|---|
| 3,797,580 A * | 3/1974 | Roth | ...................... | A01B 73/04 172/311 |
| 3,814,191 A * | 6/1974 | Tilbury | ................ | A01B 73/044 172/583 |
| 4,031,965 A * | 6/1977 | Blair | .................... | A01B 73/044 56/15.8 |
| 4,324,296 A * | 4/1982 | Schenk | ................ | A01B 73/044 172/466 |
| 4,862,758 A * | 9/1989 | Magee | ................. | A01B 73/044 172/311 |
| 5,429,195 A * | 7/1995 | Turnis | .................. | A01B 73/065 D15/27 |
| 5,492,182 A * | 2/1996 | Delaurier | ............. | A01B 73/067 172/615 |
| 6,213,219 B1 * | 4/2001 | Mosdal | ................ | A01B 73/044 172/311 |
| 2009/0056963 A1 * | 3/2009 | Horn | ...................... | A01B 73/04 172/667 |

(Continued)

Primary Examiner — Alicia Torres
(74) Attorney, Agent, or Firm — Duncan Galloway Greenwald PLLC; Kevin T. Duncan

(57) ABSTRACT

A removably installable apparatus and system for managing weight transfer along a tractor drawn tool bar for use in row planting systems is provided. The planter weight transfer system comprises first and second bolt-on bracket assemblies, each bolt-on bracket assembly comprising a primary plate and a secondary plate secured to each other and to a row planter tool bar by a set of fasteners. Additionally, the bolt-on brackets are joined at the top by an actuator which applies a force on the brackets.

11 Claims, 14 Drawing Sheets

(56) References Cited

U.S. PATENT DOCUMENTS

2014/0034341 A1\* 2/2014 Fast ..................... A01B 73/067
  172/311
2017/0034990 A1\* 2/2017 Casper ................... A01B 59/04
2019/0021212 A1\* 1/2019 Boriack ................. A01B 63/22

\* cited by examiner

SYSTEM, METHOD, AND APPARATUS FOR PLANTER WEIGHT TRANSFER

CROSS-REFERENCE TO RELATED APPLICATIONS

The present invention claims benefit of priority to U.S. Provisional Pat. App. No. 62/844,377, entitled SYSTEM, METHOD, AND APPARATUS FOR PLANTER WEIGHT TRANSFER, filed May 7, 2019 (Martin), and to U.S. Provisional Pat. App. No. 62/696,535, entitled SYSTEM, METHOD, AND APPARATUS FOR PLANTER WEIGHT TRANSFER, filed Feb. 3, 2020 (Martin et al.), both of which are incorporated herein by reference in their entirety.

FIELD OF THE INVENTION

The present disclosure is generally applicable to the field of agricultural equipment, and more particularly for improved seed trough formation, seed planting, row closing, and row cleaning in no-till farming applications.

AUTHORIZATION PURSUANT TO 37 C.F.R. § 1.171 (d)(c)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

The background description includes information that may be useful in understanding the present invention. It is not an admission that any of the information provided herein is prior art or relevant to the presently claimed invention, or that any publication specifically or implicitly referenced is prior art.

In traditional and longstanding farming methods, tilling or tillage is typically used before planting to prepare a field. Tilling a field has both herbicidal and insecticidal benefits and may serve to break up the earth to enable seedlings to more easily extend root systems. However, there are downsides to tillage that are driving modern farmers towards "low-till" or "no-till" farming systems. In these farming systems, plant matter left over from previous harvests, called residue, is left in the fields between plantings. At the time of planting, a row cleaner system is used at the front or leading portion of a planter row unit to clear only a small portion or strip of earth of the residue to enable seeds and fertilizer to be placed in the ground in connection with a coulter or other tillage tool. The row cleaner removes the residue and only very lightly tills the topmost soil or earth to provide for a clear path for seed and fertilizer placement. One key aspect to row cleaner operation is to maintain necessary clearance between the row cleaner and the coulter or other tillage tool for terrain responsive operation. Also, at the trailing end of the planter row unit closing wheels are used to close the seed slot opened during row planting operation.

No-till farming systems provide for benefits including increased water retention and absorption, and increased presence of beneficial fungi, bacteria, and fauna (e.g., earthworms). The use of a no-till farming system has the additional benefit of reducing topsoil erosion that may be caused by tilling. In no-till systems it has also been shown that because water retention is greater and soil erosion is reduced, the environmental impact from the runoff of fertilizer, herbicides, and pesticides is also reduced.

The movement towards no-till farming systems has driven the improvement of row cleaner apparatuses for planting systems. Existing row cleaner systems include fixed row cleaners, adjustable row cleaners, and floating row cleaners. These row cleaning systems are used in conjunction with planting systems mounted on a tool bar or frame. The tool bar is drawn by a tractor and is connected to the tractor by a drawbar. Modern tool bars can be exceedingly wide, with some capable of having planting equipment for 30 or more rows mounted thereon. As the number of planting rows is increased the weight and force exerted on the extremities of the tool bar is also increased because of the weight of the equipment needed for each planting row. For example, for each planting row position on a tool bar there may be a row cleaning assembly, a furrowing assembly, a planting assembly, and a row closing assembly. Additionally, equipment may also be used to adjust the position, angle, depth, and other characteristics of each assembly for each planting row.

The depth and angle of all equipment used in the planting process is crucial for consistent seed germination and growth for all planted rows. For a longer tool bar, an issue may occur when the weight at the center of the planter or tractor is significantly more than the weight at the ends of the wings or tool bars used with the planter. The decreased weight on each planting apparatus, including at the row cleaner, planter, and row closer, at distances further from the tow bar or planter may cause inconsistencies in the depth of the seed trough and in the seed planting depth. It is desirable to transfer weight from the center at the planter or tractor to the planting apparatuses on the wings to prevent the wing row units from placing the seed at an inconsistent depth. This would shift excess weight from the center. Excess weight at any point on the planter including at the planning apparatuses on the tool bar wings may cause compaction around the pinch rows between the tractor and the planter wheels. In some circumstances, for example in uneven terrain, weight at the ends of the tool bar farthest from the drawbar may cause the angle of the various assemblies to not match those of assemblies closer to the drawbar. Some systems and methods exist for compensating for this type of droop or inconsistency caused by weight on the tool bar. However, existing systems and methods typically require plates, frames, or mounts to be welded directly onto the tool bar. This type of installation method is difficult, time consuming, and is not easily removed.

What is needed is a removably installable, adjustable weight transfer system that may be used with many types of tool bars and planting configurations without the necessity of welding the weight transfer system to the tool bar to provide for the ready reconfiguration of tractor drawn row planting systems.

SUMMARY OF THE INVENTION

The present invention provides a bolt-on, removably installable, row planter tool bar weight transfer system. The weight transfer system of the present invention provides for simple installation and removal of a weight transfer system to be used with row planter tool bars. The weight transfer system may be used with newly manufactured row planter tool bars or may be used to retrofit older row planter tool bars not originally designed with a weight transfer system.

The weight transfer system may also be used to replace or supplement existing weight transfer systems and weight transfer system mounts.

The bolt-on, removably installable, row planter tool bar weight transfer system comprises a set of bolt-on brackets that are installed on both sides of a supported point of a row planter tool bar which may be a gap in a segmented tool bar or the connection between a wing bar and a main tool bar. A supported point may be a point on a tool bar where two tool bar sections are joined together, where a tool bar pivots or folds, or at any point on a tool bar where it is mechanically advantageous to provide for the shifting or transfer of weight or force along the tool bar. As the number of row planting apparatuses on a tool bar increases, the length of the tool bar must also be increased to accommodate the additional row planting apparatuses. These additional row planting apparatuses are necessarily farther from the point or points on the tool bar where the drawbar for the tractor is attached. Therefore, it is desirable to provide for the transfer of weight along the tool bar to provide for a more even distribution along its length.

In one embodiment the brackets comprise a primary plate and a top plate. The top plate sits on the top of the row planter tool bar and the primary plate is disposed on the front face. A set of tongues or protrusions on the top plate fit into openings or grooves in the primary plate to provide for mechanical support when installed on the tool bar. A set of L-bolts are used to secure the top plate and primary plate together, a set of horizontally oriented bolts are used to secure the primary plate to the front or face of the row planter tool bar, and a set of vertically oriented bolts are used to secure the top plate to the top of the row planter tool bar. The top plate may also have a set of threaded protrusions that extend out from one end that may be used as mounting points for additional row planter equipment, such as support wheels, cleaning wheels, and coulters.

In another embodiment the brackets comprise first and second bracket assemblies, which may be referred to as pull arms, each having primary, secondary, and bottom plates. The primary and secondary plates of each assembly are positioned on top of the row planter tool bar and are secured to each other and to the tool bar by a set of fasteners. Additional fasteners are used to secure the primary and secondary plates to the bottom plate, which is positioned beneath the row planter tool bar. In one embodiment, the first and second assemblies are positioned respectively on first and second tool bars or on a primary tool bar and a wing tool bar. The first and second tool bars may be separate assemblies joined primarily or in part by the first and second bracket assemblies. A set of limiting straps, which may be referred to herein as a mid plate or pull arm assembly, comprising a first and a second mid plate may be used to further join the first and second bracket assemblies and to provide an additional point to transfer force between the first and second brackets. These limiting straps may be normally installed on a planter or tool bar and are used to limit the movement of the wing bar relative to the tool bar on the tractor.

Additionally, the design of the bracket assemblies of the claimed invention may be changed to accommodate being installed on the right or left side, relative to the center point, tow bar, or tractor, of a row planter. As shown, the design and configuration of the bracket assemblies of the present invention may be mirrored to accommodate being installed on an opposite side of the tractor.

In an installed configuration, ends of a mechanical actuator (e.g., a hydraulic or pneumatic cylinder) are attached to the tops of the primary plates of the two bolt-on brackets in one embodiment. The each of bolt-on brackets may be installed on either side of the supported point and have a plurality of mounting points for the mechanical actuator on the first and second bracket assemblies. The actuator, when connected to hydraulic, electric, or pneumatic power, may be adjusted to exert a force between the two bolt-on brackets. This may cause the top of one bracket to be pushed away from the other bracket or pulled towards the other bracket with the supported point being a pivot point between the two brackets. By adjusting the force exerted by the mechanical actuator, and end of the tool bar may either be raised or lowered relative to the supported point of the tool bar, the middle point of the tool bar, or both. Adjusting the angle of the tool bar provides for even engagement with the ground or soil along the length of the tool bar by all row planting equipment or planting system apparatuses installed thereon.

The adjustment of the weight applied to the tool bar causes the various assemblies that comprise each of the row units to properly engage with the soil. For example, increasing the pressure applied by the actuator increases the weight transferred to the wing bar or tool bar, further engaging the row unit assemblies with the soil. The weight may also be decreased as necessary to prevent over engagement with the soil. Controlling proper engagement with the soil for the row units and the various assemblies installed thereon (e.g., a row cleaning assembly, a furrowing assembly, a planting assembly, and a row closing assembly) is important for planting seeds a proper seed depth. Having proper engagement with the soil is also required for controlling furrow depth, row cleaning action, and row closing action. Too much or too little engagement with the soil for any assembly of the row unit may cause the row to not be properly cleaned, the furrow to be dug incorrectly, the seeds to be planted at either too deep or too shallow a depth, and may also cause the furrow to not be properly closed (e.g., overly compacted or insufficiently closed). Ensuring consistent soil engagement at the proper depth for the assemblies of the row unit by transferring weight along the tool bar by the weight transfer systems of the present invention provides for consistent and predicable seed emergence and growth characteristics across all planted rows regardless of the distance from the center of the planter on the tool bar.

A specific advantage provided by the bracket assemblies of the claimed invention is that the force exerted by the mechanical actuator is distributed over the top and bottom of the tool bar and is further regulated by the use of the limiting strap assembly. Other configurations of weight transfer systems existing in the prior art require drilling or modification of a row planter tool bar to be installed and distribute force on the bolts or fasteners used for installation. This can cause the bolts to deform or shear and may also cause the nuts used to secure the bolts to be worked loose or free in operation. The present invention provides an improvement to existing designs by being installable without requiring modification of the row planter tool bar and further distributes force on the tool bar and not on the fastening means (e.g., bolts) used to secure the weight transfer system of the present invention to the tool bar.

Row cleaner designs, such as adjustable row cleaners as provided in U.S. Pat. No. 7,861,660, entitled ADJUSTABLE ROW CLEANER, Martin, issued Jan. 4, 2011; U.S. Pat. No. 8,794,165, entitled ADJUSTABLE ROW CLEANER, Martin, issued Aug. 5, 2014; and in U.S. Pat. No. 9,743,572, entitled ADJUSTABLE ROW CLEANER, Martin, issued Aug. 29, 2017; and such as floating row cleaners provided U.S. Pat. No. 8,631,879B1, entitled COMPACT FLOAT- ING ROW CLEANER, Martin, issued Jan. 21, 2014; and U.S. Pat. No. 9,642,298, entitled COMPACT FLOATING ROW CLEANER, Martin, issued May 9, 2017; and U.S. Prov. Pat. App. No. 62/623,198, entitled COMPACT PARALLEL ARM ROW CLEANER, Martin et al., filed Jan. 28, 2018; each of which are incorporated by reference herein in their entirety, may be used with the row planter tool bar and removably installable planter tool bar weight transfer system of the present invention.

In one embodiment, the present invention provides a removably installable row planter tool bar weight transfer system, the system comprising: a set of fasteners; a first bolt-on bracket and a second bolt-on bracket, wherein the first and second bolt-on brackets comprise: a primary plate substantially oriented on a first plane and comprising: a body having a front, a back, an upper portion, and a lower portion; the upper portion of the primary plate having a set of openings for securing an end of a mechanical actuator; the lower portion comprising a connecting portion, and further comprising parallel first and second arms separated by an intermediate opening, the first and second arms each having a proximal end at the connecting portion and a distal end; the first and second arms each having a groove cutout at the proximal end; and the first and second arms each having a set of proximal end fastener openings and a set of distal end fastener openings; a top plate oriented on a second plane perpendicular to the first plane, the top plate comprising: a body, a first end, and a second end; a set of tongues at the first end corresponding to the groove cutouts of the first and second arms; and a set of fastener openings at the second end; wherein the groove cutouts of the first and second arms receive the set of tongues of the top plate in an installed configuration; and wherein the set of proximal end fastener openings and the set of distal end fastener openings of the first and second arms of the primary plate and the set of fastener openings of the second end of the top plate receive the set of fasteners in an installed configuration, the set of fasteners securing the primary plate to the top plate and to a row planter tool bar.

The system of the above embodiment may further comprise wherein the mechanical actuator is secured to the upper portion of the primary plate of the first bolt-on bracket and to the upper portion of the primary plate of the second bolt-on bracket. The mechanical actuator may be adapted to apply a force to the first and second bolt-on brackets. The mechanical actuator may be a hydraulic cylinder. The primary plate of the first and second bolt-on brackets may comprise: an angled portion between the upper portion and the connecting portion of the lower portion, the angled portion being angled out from the first plane; and wherein the upper portion is oriented on a third plane parallel to the first plane. The set of fasteners may comprise a set of flange head bolts and a set of L-bolts, the set of flange head bolts and the set of L-bolts secured by a corresponding set of nuts. The set of L-bolts and corresponding set of nuts may secure the primary plate to the top plate and to the row planter tool bar when installed in the set of fastener openings in the second end of the top plate and in the set of distal end fastener openings of the first and second arms of the primary plate. The set of flange head bolts may comprise: a set of vertically oriented bolts and a set of horizontally oriented bolts; wherein the set of vertically oriented bolts are disposed in the set of fastener openings of the second end of the top plate and secure the top plate to the row planter tool bar in an installed configuration; and wherein the set of horizontally oriented bolts are disposed in the set of proximal end fastener openings and the set of distal end fastener openings of the first and second arms of the lower portion of the primary plate and the primary plate to the row planter tool bar in an installed configuration. The top plate may further comprise a set of threaded mounting points at the first end, the set of threaded mounting points positioned in the intermediate opening between the first and second arms of the primary plate.

In another embodiment, the present invention provides a bolt-on bracket for use in a removably installable row planter tool bar weight transfer system, the bolt-on bracket comprising: a set of fasteners; a primary plate substantially oriented on a first plane and comprising: a body having a front, a back, an upper portion, and a lower portion; the upper portion of the primary plate having a set of openings for securing an end of a mechanical actuator; the lower portion comprising a connecting portion, and further comprising parallel first and second arms separated by an intermediate opening, the first and second arms each having a proximal end at the connecting portion and a distal end; the first and second arms each having a groove cutout at the proximal end; and the first and second arms each having a set of proximal end fastener openings and a set of distal end fastener openings; a top plate oriented on a second plane perpendicular to the first plane, the top plate comprising: a body, a first end, and a second end; a set of tongues at the first end corresponding to the groove cutouts of the first and second arms; and a set of fastener openings at the second end; wherein the groove cutouts of the first and second arms receive the set of tongues of the top plate in an installed configuration; and wherein the set of proximal end fastener openings and the set of distal end fastener openings of the first and second arms of the primary plate and the set of fastener openings of the second end of the top plate receive the set of fasteners in an installed configuration, the set of fasteners securing the primary plate to the top plate and to a row planter tool bar. The bracket of the above embodiment may further comprise wherein the mechanical actuator is secured to the upper portion of the primary plate of the bolt-on bracket and to an upper portion of a primary plate of a second bolt-on bracket. The mechanical actuator may be adapted to apply a force to the first and second bolt-on brackets. The mechanical actuator may be a hydraulic cylinder. The primary plate of the bolt-on bracket further may comprise: an angled portion between the upper portion and the connecting portion of the lower portion, the angled portion being angled out from the first plane to a third plane parallel to the first plane; and wherein the upper portion is oriented on the third plane. The set of fasteners may comprise a set of flange head bolts and a set of L-bolts, the set of flange head bolts and the set of L-bolts secured by a corresponding set of nuts. The set of L-bolts and corresponding set of nuts may secure the primary plate to the top plate and to the row planter tool bar when installed in the set of fastener openings in the second end of the top plate and in the set of distal end fastener openings of the first and second arms of the primary plate. The set of flange head bolts may comprise: a set of vertically oriented bolts and a set of horizontally oriented bolts; wherein the set of vertically oriented bolts are disposed in the set of fastener openings of the second end of the top plate and secure the top plate to the row planter tool bar in an installed configuration; and wherein the set of horizontally oriented bolts are disposed in the set of proximal end fastener openings and the set of distal end fastener openings of the first and second arms of the lower portion of the primary plate and secure the primary plate to the row planter tool bar in an installed configuration. The top plate may further comprise a set of threaded mounting points at the first end, the set of threaded mounting points positioned in the intermediate opening between the first and second arms of the primary plate.

In one embodiment, the present invention provides a removably installable row planter tool bar weight transfer system adapted to adjust weight transfer along a row planter tool bar by a mechanical actuator, the system comprising: a first bracket assembly comprising: a primary bracket plate comprising: a main plate portion having a first end and a second end, the first end having a pin opening corresponding to a first pin on the row planter tool bar; a mating plate portion connected to the main plate portion by an angled portion and positioned at the second end of the main plate, the mating plate portion having an opening for securing an end of the mechanical actuator; a rear plate portion connected and perpendicular to the main plate portion, the rear plate portion having an upper tool bar plate adapted to sit on an upper surface of the row planter tool bar; a secondary bracket plate comprising: a main plate portion having a first end and a second end, the first end having a pin opening corresponding to the first pin on the row planter tool bar; a mating plate portion connected to the main plate portion by an angled portion and positioned at the second end of the main plate, the mating plate portion having an opening for securing a first end of the mechanical actuator; a lower tool bar plate adapted to be positioned on a bottom surface of the row planter tool bar; a first set of fasteners for securing the primary bracket plate to the secondary bracket plate and for securing the primary bracket plate and secondary bracket plate to the lower tool bar plate; a second bracket assembly comprising: a primary bracket plate comprising: a main plate portion having a first end and a second end, the first end having a pin opening corresponding to a second pin on the row planter tool bar; a mating plate portion connected to the main plate portion by an angled portion and positioned between the first end and the second end of the main plate, the mating plate portion having an opening for securing a second end of the mechanical actuator; a rear plate portion connected and perpendicular to the main plate portion, the rear plate portion having an upper tool bar plate adapted to sit on the upper surface of the row planter tool bar; a secondary bracket plate comprising: a main plate portion having a first end and a second end, the first end having a pin opening corresponding to the second pin on the row planter tool bar; a mating plate portion connected to the main plate portion by an angled portion and positioned between the first end and the second end of the main plate, the mating plate portion having an opening for securing an end of the mechanical actuator; a lower tool bar plate adapted to be positioned on the bottom surface of the row planter tool bar; a second set of fasteners for securing the primary bracket plate to the secondary bracket plate and for securing the primary bracket plate and secondary bracket plate to the lower tool bar plate; a mid plate assembly comprising a first and a second mid plate, each of the first and the second mid plates having a first pin opening and a second pin opening corresponding to the first and the second pins on the row planter tool bar, wherein the first pin opening of each of the first and the second mid plates is larger than the first pin and permits the first pin to move in the first pin opening; and wherein the first bracket assembly and the second bracket assembly when secured to the row planter tool bar are adapted to provide for the application of a force on the row planter tool bar by the mechanical actuator.

In another embodiment, the present invention provides a removably installable row planter tool bar weight transfer system adapted to adjust weight transfer along a row planter tool bar by a mechanical actuator, the system being installable on the row planter tool bar without modification to the row planter tool bar, the system comprising: a first removably installable bolt-on bracket assembly; a second removably installable bolt-on bracket assembly; an actuator assembly connected at a first end to the first removably installable bolt-on bracket assembly and at a second end to the second removably installable bolt-on bracket assembly; wherein the first removably installable bolt-on bracket assembly and the second removably installable bolt-on bracket assembly when secured to the row planter tool bar are adapted to provide for the application of a force on the row planter tool bar by the mechanical actuator. The removably installable row planter tool bar weight transfer system may further comprise a set of position sensors configured to determine a position of a row planter unit to determine an actuation position for the mechanical actuator.

In another embodiment, the present invention provides a removably installable row planter tool bar weight transfer system adapted to adjust weight transfer along a row planter tool bar by an actuator, the system comprising: a first bracket assembly comprising: a primary bracket plate; a secondary bracket plate; a lower tool bar plate; a first set of fasteners for securing the primary bracket plate to the secondary bracket plate and for securing the primary bracket plate and secondary bracket plate to the lower tool bar plate; a second bracket assembly comprising: a primary bracket plate; a secondary bracket plate; a lower tool bar plate; a second set of fasteners for securing the primary bracket plate to the secondary bracket plate and for securing the primary bracket plate and secondary bracket plate to the lower tool bar plate; a mid plate assembly comprising a first and a second mid plate; and wherein the first bracket assembly and the second bracket assembly when secured to the row planter tool bar are adapted to provide for the application of a force on the row planter tool bar by the actuator.

The primary bracket plate of the first bracket assembly of the weight transfer system of the above embodiment may further comprise: a main plate portion having a first end and a second end, the first end having a pin opening corresponding to a first pin on the row planter tool bar; a mating plate portion connected to the main plate portion by an angled portion and positioned at the second end of the main plate, the mating plate portion having a securement for securing an end of the actuator; and a rear plate portion connected and perpendicular to the main plate portion, the rear plate portion having an upper tool bar plate adapted to sit on an upper surface of the row planter tool bar. The secondary bracket plate of the first bracket assembly may further comprise: a main plate portion having a first end and a second end, the first end having a pin opening corresponding to the first pin on the row planter tool bar; and a mating plate portion connected to the main plate portion by an angled portion and positioned at the second end of the main plate, the mating plate portion having a securement for securing a first end of the actuator. The lower tool bar plate of the first bracket assembly or the second bracket assembly may be adapted to be positioned on a bottom surface of the row planter tool bar. The primary bracket plate of the second bracket assembly may further comprise: a main plate portion having a first end and a second end, the first end having a pin opening corresponding to a second pin on the row planter tool bar; a mating plate portion connected to the main plate portion by an angled portion and positioned between the first end and the second end of the main plate, the mating plate portion having a securement for securing a second end of the actuator; and a rear plate portion connected and perpendicular to the main plate portion, the rear plate portion having an upper tool bar plate adapted to sit on the upper surface of the row planter tool bar. The secondary bracket plate of the second bracket assembly may further comprise: a main plate portion having a first end and a second end, the first end having a pin opening corresponding to the second pin on the row planter tool bar; and a mating plate portion connected to the main plate portion by an angled portion and positioned between the first end and the second end of the main plate, the mating plate portion having a securement for securing an end of the actuator. The mid plate assembly may further comprise each of the first and the second mid plates having a first pin opening and a second pin opening corresponding to the first and the second pins on the row planter tool bar, wherein the first pin opening of each of the first and the second mid plates is larger than the first pin and permits the first pin to move in the first pin opening. The actuator may be a hydraulic actuator. The actuation of the actuator may be based on a control signal from a controller and derived from an output of at least one sensor.

In another embodiment, the present invention provides a removably installable row planter tool bar weight transfer system, the system comprising: a set of fasteners; a first bracket and a second bracket, wherein the first and second brackets comprise: a primary plate substantially oriented on a first plane and comprising: a body having a front, a back, an upper portion, and a lower portion; the upper portion of the primary plate having a securement for securing an end of an actuator; the lower portion comprising a connecting portion, and further comprising at least one arm having a proximal end at the connecting portion and a distal end; the at least one arm having a notch at the proximal end; and the at least one arm having a first set of fastening components; a top plate oriented on a second plane perpendicular to the first plane, the top plate comprising: a body, a first end, and a second end; a tongue at the first end adapted to be matingly received in the notch of the at least one arm; and a second set of fastening components corresponding to the first set of fastening components and adapted to cooperate with the set of fasteners to secure the top plate and the primary plate to the tool bar; wherein the notch of the at least one arm receives the tongue of the top plate in an installed configuration; and wherein the first and second fastening components and the set of fasteners secure the first and second brackets in an installed configuration, the set of fasteners securing the first and second brackets to a row planter tool bar.

The system of the above embodiment may further comprise, wherein the actuator is secured to the securement of the primary plate of the first bracket and to the securement of the primary plate of the second bracket. The actuator may be adapted to apply a force to the first and second brackets. The actuator may be a hydraulic cylinder. The primary plate of the first and second brackets may comprise: an angled portion between the upper portion and the connecting portion of the lower portion, the angled portion being angled out from the first plane; and wherein the upper portion is oriented on a third plane parallel to the first plane. The set of fasteners may comprise a set of flange head bolts and a set of L-bolts, the set of flange head bolts and the set of L-bolts secured by a corresponding set of nuts. The set of L-bolts and corresponding set of nuts secure the primary plate to the top plate and to the row planter tool bar when installed in the first set of fastening components and the second set of fastening components. The set of flange head bolts may further comprise: a set of vertically oriented bolts and a set of horizontally oriented bolts; the set of vertically oriented bolts disposed in the second set of fastening components secure the top plate to the row planter tool bar in an installed configuration; and the set of horizontally oriented bolts disposed in the first set of fastening components secure the primary plate to the row planter tool bar in an installed configuration. The top plate may further comprise a set of threaded mounting points at the first end, the set of threaded mounting points positioned in an intermediate opening between the at least one arm and a second arm of the primary plate.

In another embodiment, the present invention provides a bracket for use in a removably installable row planter tool bar weight transfer system, the bracket comprising: a set of fasteners; a primary plate substantially oriented on a first plane and comprising: a body having a front, a back, an upper portion, and a lower portion; the upper portion of the primary plate having a securement for securing an end of an actuator; the lower portion comprising a connecting portion, and further comprising at least one arm having a proximal end at the connecting portion and a distal end; the at least one arm having a notch at the proximal end; and the at least one arm having a first set of fastening components; a top plate oriented on a second plane perpendicular to the first plane, the top plate comprising: a body, a first end, and a second end; a tongue at the first end adapted to be matingly received in the notch of the at least one arm; and a second set of fastening components corresponding to the first set of fastening components and adapted to cooperate with the set of fasteners to secure the top plate and the primary plate to the tool bar; wherein the notch of the at least one arm receives the tongue of the top plate in an installed configuration; and wherein the first and second fastening components and the set of fasteners secure the bracket in an installed configuration, the set of fasteners securing the bracket to a row planter tool bar.

The bracket of the above embodiment may further comprise, wherein the actuator is secured to the securement of the primary plate of the bracket and to a securement of a primary plate of a second bracket. The actuator may be adapted to apply a force to the bracket and to the second brackets. The actuator may be a hydraulic cylinder. The primary plate of the bracket may further comprise: an angled portion between the upper portion and the connecting portion of the lower portion, the angled portion being angled out from the first plane to a third plane parallel to the first plane; and wherein the upper portion is oriented on the third plane. The set of fasteners may comprise a set of flange head bolts and a set of L-bolts, the set of flange head bolts and the set of L-bolts secured by a corresponding set of nuts. The set of L-bolts and corresponding set of nuts may secure the primary plate to the top plate and to the row planter tool bar when installed in the second set of fastening components and in the first set of fastening components of the primary plate. The set of flange head bolts may further comprise: a set of vertically oriented bolts and a set of horizontally oriented bolts; the set of vertically oriented bolts disposed in the second set of fastening components secure the top plate to the row planter tool bar in an installed configuration; and the set of horizontally oriented bolts disposed in first set of fastening components secure the primary plate to the row planter tool bar in an installed configuration. The top plate may further comprise a set of threaded mounting points at the first end, the set of threaded mounting points positioned in an intermediate opening between the at least one arm and a second arm of the primary plate.

In another embodiment, the present invention provides a removably installable row planter tool bar weight transfer system adapted to adjust weight transfer along a row planter tool bar by an actuator, the system being installable on the row planter tool bar without modification to the row planter tool bar, the system comprising: a first removably installable bracket assembly; a second removably installable bracket assembly; an actuator assembly connected at a first end to a securement of the first removably installable bracket assembly and at a second end to a securement of the second removably installable bracket assembly; wherein the first removably installable n bracket assembly and the second removably installable bracket assembly, when secured to the row planter tool bar, are adapted to provide for the application of a force on the row planter tool bar by the actuator assembly. The removably installable row planter tool bar weight transfer system may further comprise a set of sensors configured to determine a position of a row planter unit relative to a central point to determine an actuation position for the actuator.

BRIEF DESCRIPTION OF THE FIGURES

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION

Figure 1:
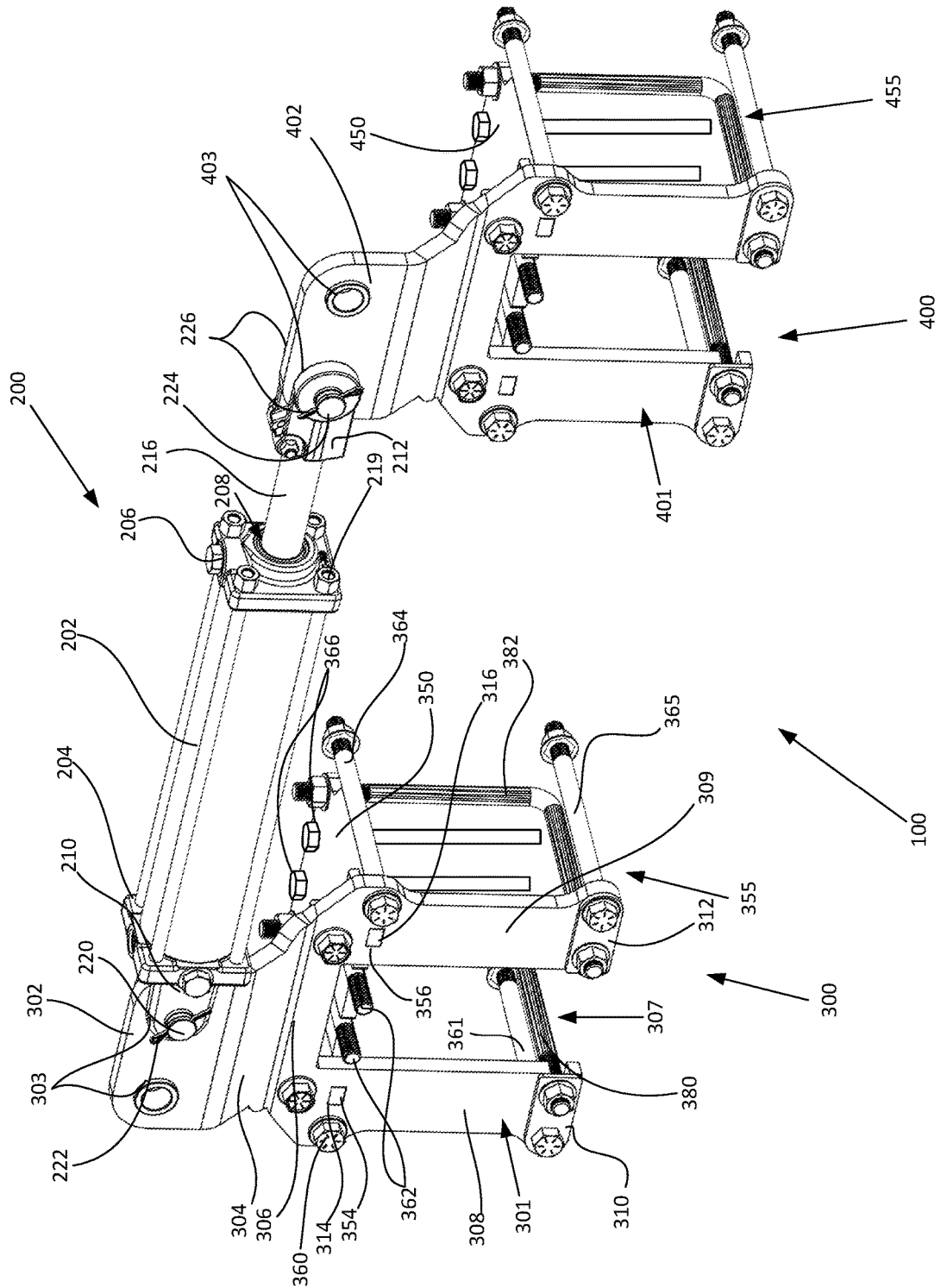
FIG. 1 provides a front perspective view of a removably installable bolt-on bracket system for weight transfer on a row planter tool bar according to an embodiment of the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used herein, "fastener" may mean any suitable fastening means such as a nut and bolt, a rivet, or a pin and cotter pin. Typically, as used herein a fastener refers to a threaded bold, which may have a hexagonal bolt head, secured by a correspondingly threaded nut having a hexagonal outer surface, wherein one or more washers may be used to permit movement of a fastened object about the bolt. In some embodiments, a locking nut may be used to further secure the nut to the bolt and to prevent the nut from backing off of the threads of the bolt.

The present invention provides a removably installable row planter tool bar weight transfer system adapted to adjust weight transfer along a row planter tool bar or set of row planter tool bars by an actuator. With reference now to FIG. 1, a front perspective view of a removably installable bolt-on bracket system for weight transfer 100 on a row planter tool bar according to an embodiment of the present invention is provided. The bracket system 100 comprises a first or left bolt-on bracket assembly 300, a second or right bolt-on bracket assembly 400, and an actuator assembly 200. The first 300 and second 400 bracket assemblies may be substantially similar or identical, comprising similar components in similar configurations providing for simpler manufacture, assembly, and installation on a row planter tool bar. As described herein, all elements of the first bolt-on bracket 300 may be present in the second bolt-on bracket 400 except as otherwise noted.

The first bolt-on bracket 300 comprises a primary plate 301 and a top plate 350. The primary plate 301, in an installed configuration, is disposed on the front or face of a row planter tool bar and is oriented in a generally vertical configuration on a plane parallel to the face of the row planter tool bar. The top plate 350, in an installed configuration, is disposed on the top or upper surface of a row planter tool bar and is oriented in a generally horizontal configuration on a plane that is parallel to the top of the row planter tool bar and perpendicular to the primary plate 301.

The primary plate 301 comprises a top portion 302, and angled portion 304, a connecting or connector portion 306, first or left arm 308, and second or right arm 309. The connecting portion 306 joins the arms 308 and 309 which are separated by an intermediate space 307 between them to accommodate the threaded mounting points 362 of the top plate 350. A set of grooves or cut-outs 314 and 316 in the respective first arm 308 and second arm 309 are correspondingly shaped to a set of tongues or protrusions 354 and 356 of the top plate 350. In an installed configuration, the tongues 354 and 356 fit into the respective cut-outs 314 and 316 to properly position the top plate 350 and to provide for mechanical support for the primary plate 301. The proximal ends of the arms 308 and 309 are connected to and are at the connecting portion 306 and the respective bottoms or distal ends 310 and 312 of the arms 308 and 309 are separated by an intermediate space or opening 307.

The angled portion 304 extends out from the connecting portion 306 to the top portion 302, which is positioned out from and above the row planter tool bar on a plane parallel to the face of the row planter tool bar. A set of openings 303 in the top portion 302 provide for the installation of one end of the actuator 200. The actuator 200 may have a body 202 which may be filled with a pneumatic or hydraulic fluid and may be a pneumatic type actuator such as a MARTIN SMARTCLEAN pneumatic actuator but may also be a suitable hydraulic or other actuator type. The actuator may be controlled by a system such as is described in U.S. patent application Ser. No. 15/690,269, entitled WIRELESS CONTROL SYSTEM FOR FLOATING ROW CLEANER, Martin, filed Aug. 29, 2017, which is incorporated by reference herein in its entirety. The actuator may also be an electronic or electro-mechanical actuator suitable for the weight transfer system application.

The actuator 200 comprises a cylinder 202 sealed at both ends 204 and 206 in which is positioned a piston 208 having a piston arm 216. The actuator 200 is secured at one end 210 to the top 302 of the first bracket 300 at the mounting point or opening 303 by a pivot pin 220 and is secured by a cotter pin 222 or other suitable securing means. The actuator 200 is secured at an other end 212 to the top 402 of the primary plate 401 of the second bracket 400 at the mounting point or opening 403 by a pivot pin 224 and is secured by a cotter pin 226 or other suitable securing means. The actuator 200 may be a hydraulic or pneumatic cylinder or may be an electrical actuator. In the embodiment shown in FIG. 1, the actuator 200 is a hydraulic actuator which would be connected to one or more hydraulic power supply lines at connection points at the end 204. Varying hydraulic pressure from the supply lines would move the piston 208 and piston arm 216 in or out which would change the position of the first bracket 300 relative to the second bracket 400 about a supported point, such as the supported point 606 shown in FIG. 6.

A set of fasteners 355, and a similar set of fasteners 455 for the bracket 400, are used to secure the top plate 350 and the primary plate 301 to a row planter tool bar. The primary plate 301 is secured to the face of the row planter tool bar by a set of horizontally oriented fasteners 360, 361, 364, and 365 which may fit into corresponding openings on the row planter tool bar. The top plate 350 is secured to the top of the row planter tool bar by a set of vertically oriented fasteners 366 which may fit into corresponding openings on the row planter tool bar. The set of horizontally oriented fasteners 360, 361, 364, and 365 and the set of vertically oriented fasteners 366 may be flange bolts or hex bolts having fully or partially threaded shafts secured by nuts such as flanged nuts, locking nuts, or nuts and washers. The 90 degree or l-bolts 380 and 382 are bolts or rods threaded at both ends which are angled at a 90-degree right angle at or about the midpoint of the bolt. The l-bolts 380 and 382 are shaped to join the distal ends 310 and 312 of the arms 308 and 309 to the top plate 350 by passing around the tool bar. From a side profile, the primary plate 301, top plate 350, and l-bolts 380 and 382 form a substantially rectangular shape that completely surrounds the row planter tool bar and in conjunction with the set of grooves 314 and 316 and tongues 354 and 356, fully secures and positions the top plate 350 and primary plate 301 of the bracket 300 on the tool bar.

Figure 2:
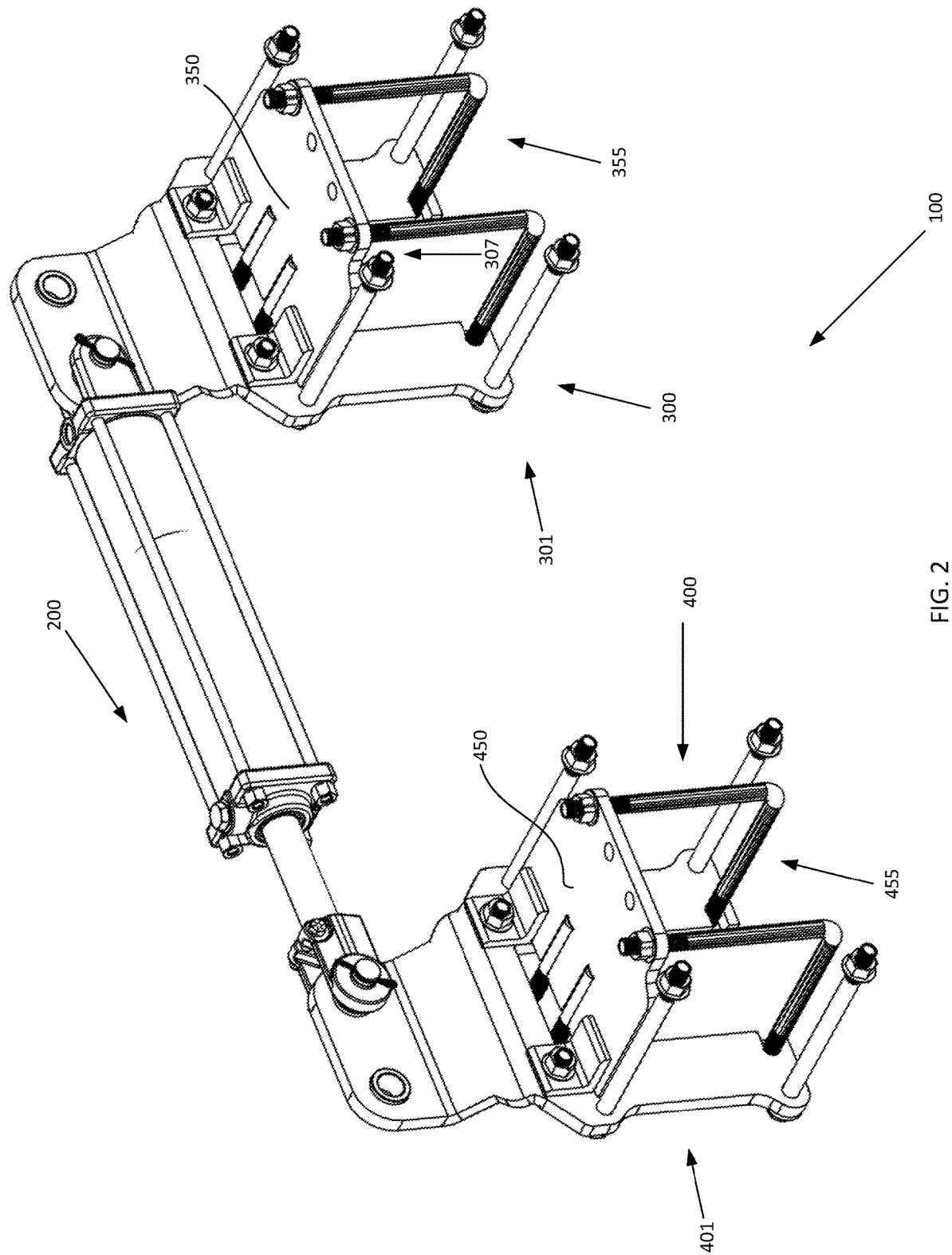
FIG. 2 provides a rear perspective view of a removably installable bolt-on bracket system for weight transfer on a row planter tool bar according to an embodiment of the present invention.

With reference now to FIG. 2, a rear perspective view of a removably installable bolt-on bracket system for weight transfer 100 on a row planter tool bar according to an embodiment of the present invention is provided. In this view, the orientation of the top plates 350 and 450 relative to the primary plates 301 and 401 of the respective first bracket 300 and second bracket 400 can be more clearly seen. The top plates 350 and 450 are positioned perpendicular to the primary plates 301 and 401 and sit flush against the backs of the primary plates. The position and orientation of the sets of fasteners 355 and 455 is also shown. The l-bolts 380 and 382, the set of horizontally oriented fasteners 360, 361, 364, and 365, and the set of vertically oriented fasteners 366 of the set of fasteners 355, and similarly in the set of fasteners 455, function as a system to properly position and secure the primary plate 301 and the top plate 350 on a row planter tool bar.

Figure 3:
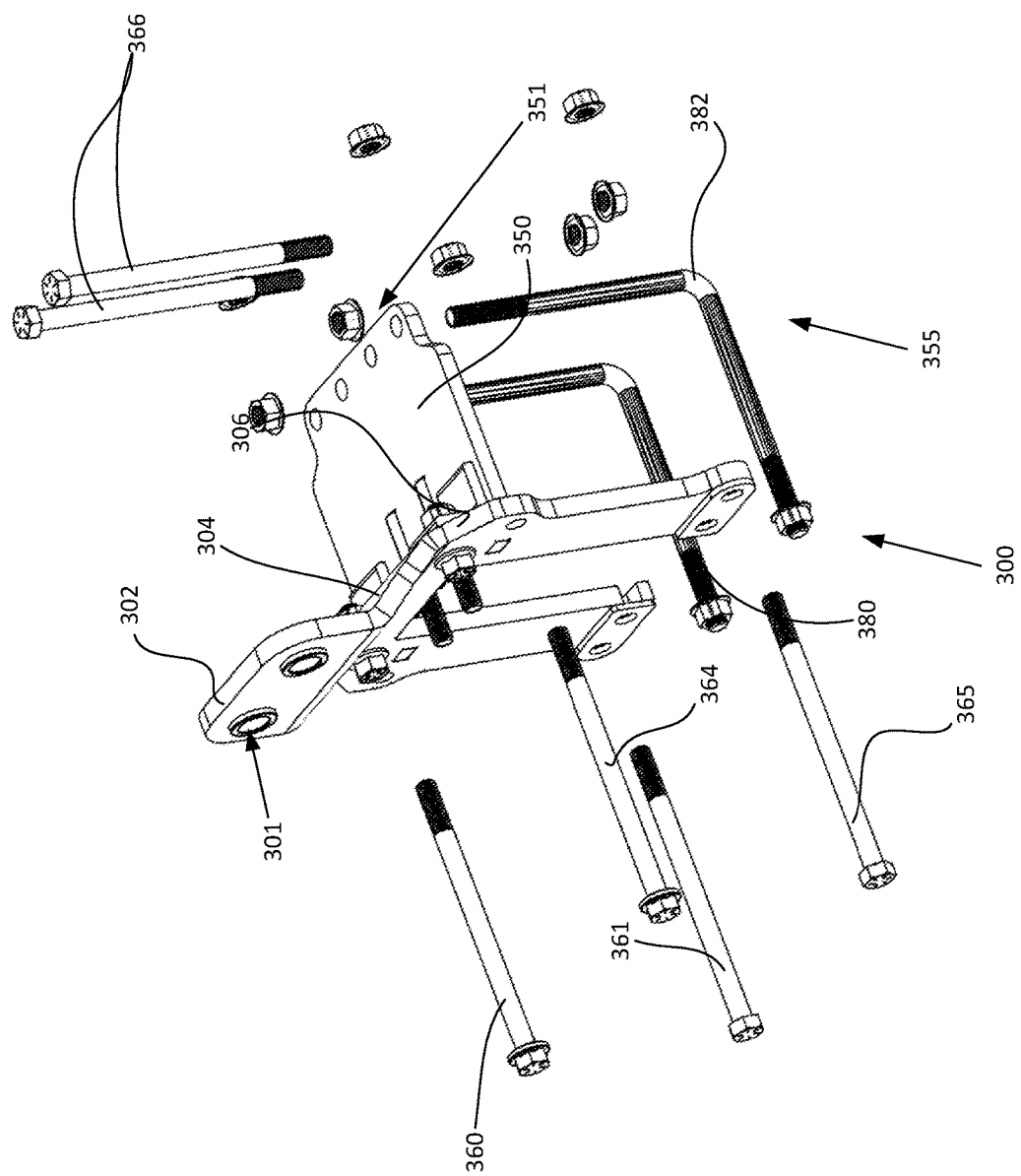
FIG. 3 provides an exploded top perspective view of a removably installable bolt-on bracket for use in a removably installable bolt-on bracket system for weight transfer on a row planter tool bar according to an embodiment of the present invention.

With reference now to FIG. 3, an exploded top perspective view of a removably installable bolt-on bracket 300 for use in a removably installable bolt-on bracket system for weight transfer on a row planter tool bar according to an embodiment of the present invention is provided. The l-bolts 380 and 382, the set of horizontally oriented fasteners 360, 361, 364, and 365, and the set of vertically oriented fasteners 366 of the set of fasteners 355 function as a system to properly position and secure the primary plate 301 and the top plate 350 on a row planter tool bar. The l-bolts 380 and 382 are shaped to join the distal ends 310 and 312 of the arms 308 and 309 to the top plate 350 by passing around the tool bar. From a side profile, the primary plate 301, top plate 350, and l-bolts 380 and 382 form a substantially rectangular shape that completely surrounds the row planter tool bar and in conjunction with the set of grooves 314 and 316 and tongues 354 and 356, fully secures and positions the top plate 350 and primary plate 301 of the bracket 300 on the tool bar.

Figure 4:
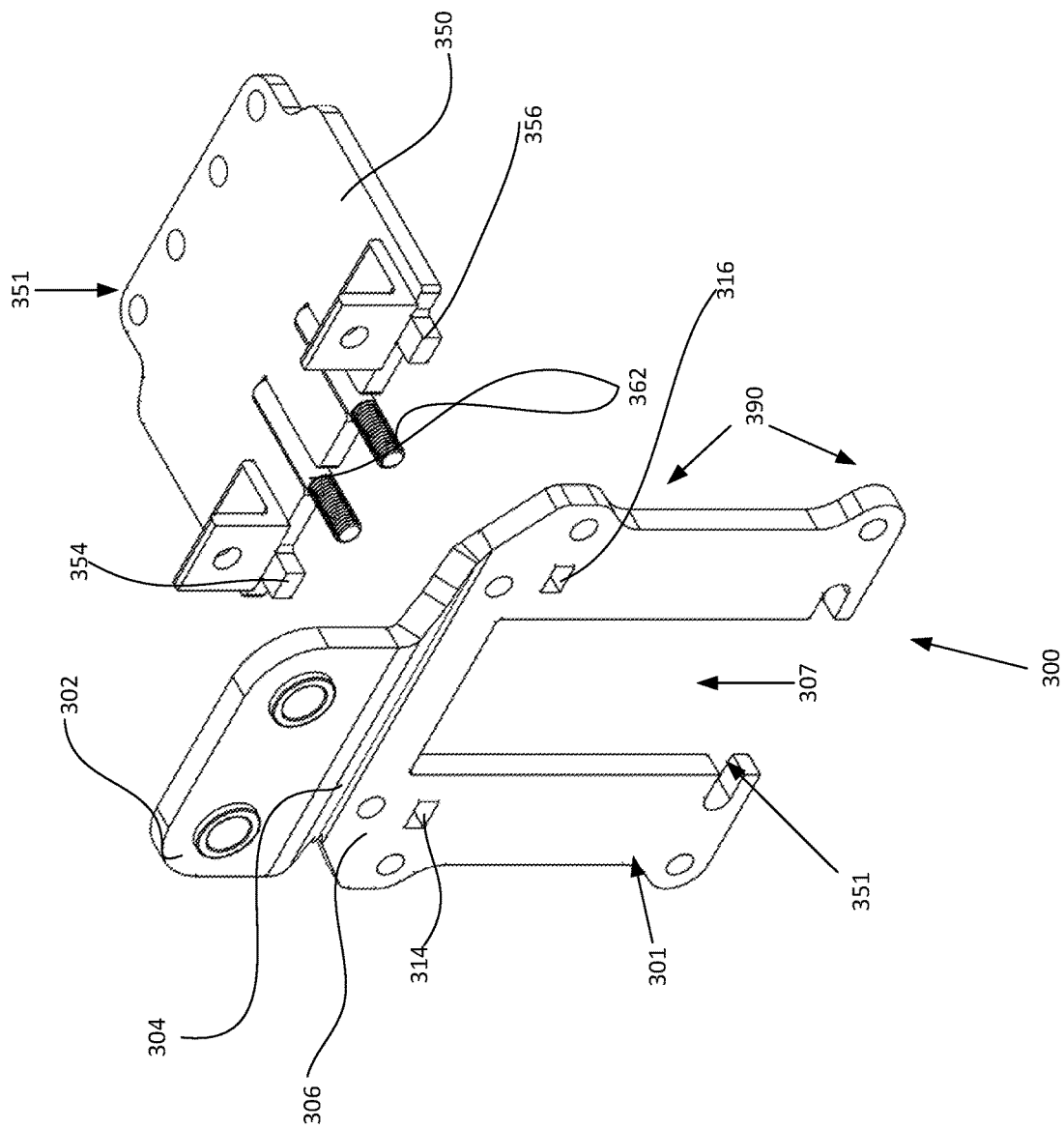
FIG. 4 provides a front perspective view of a primary plate and a top plate of a removably installable bolt-on bracket for use in a removably installable bolt-on bracket system for weight transfer on a row planter tool bar in a separated configuration according to an embodiment of the present invention.
Figure 5:
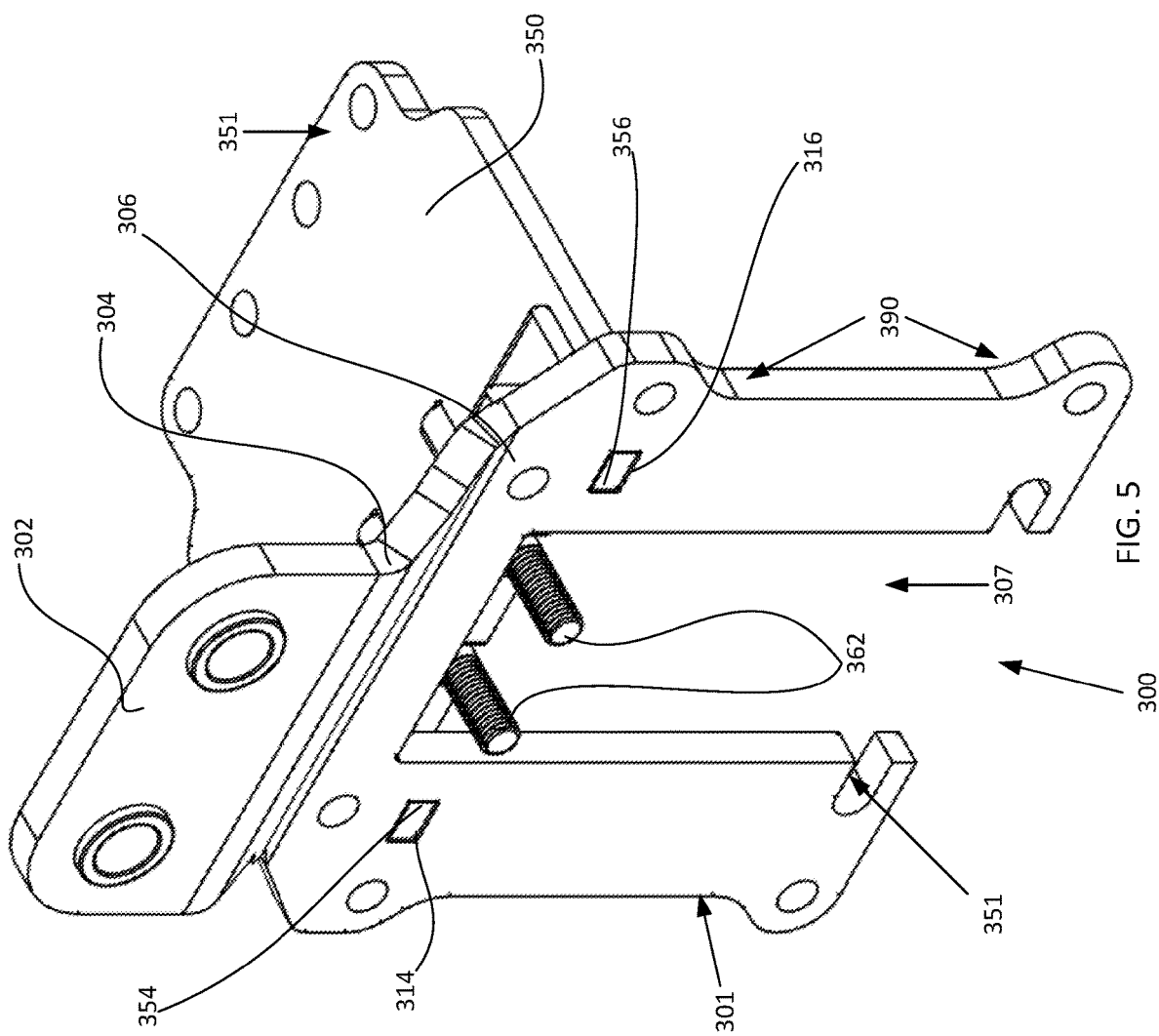
FIG. 5 provides a front perspective view of a primary plate and a top plate of a removably installable bolt-on bracket for use in a removably installable bolt-on bracket system for weight transfer on a row planter tool bar in a joined or installed configuration according to an embodiment of the present invention.

With reference now to FIGS. 4 and 5, a front perspective view of a primary plate 301 and a top plate 350 of a removably installable bolt-on bracket 300 for use in a removably installable bolt-on bracket system for weight transfer on a row planter tool bar in a separated configuration (FIG. 4) and joined or installed configuration (FIG. 5) according to an embodiment of the present invention is provided. The tongues 354 and 356 of the top plate 350 matingly correspond to the respective cutouts or grooves 314 and 316 of the primary plate 301 and provide a solid mechanical interface between the top plate 350 and primary plate 301. The angle of the angled portion 304 and position of the top portion 302 relative to the connecting portion 306 can also be seen. The top portion 302 is positioned relatively above and out from, but on a parallel plane to, the arms 308 and 309, and connecting portion 306 of the primary plate 301. Shown without the set of fasteners 355, the openings 351 in the top plate 350 and the proximal and distal openings 390 of the primary plate 301 can be seen. The openings 351 in the primary plate 350 for the l-bolts 380 and 382 may be pass-through openings or may be cut-outs as shown in this embodiment. The intermediate opening 307 may be used to properly position an attachment for the row planter which may be secured to the mounting points 362 which may be threaded mounting points with nuts or other suitable fastening or securing means.

Figure 6:
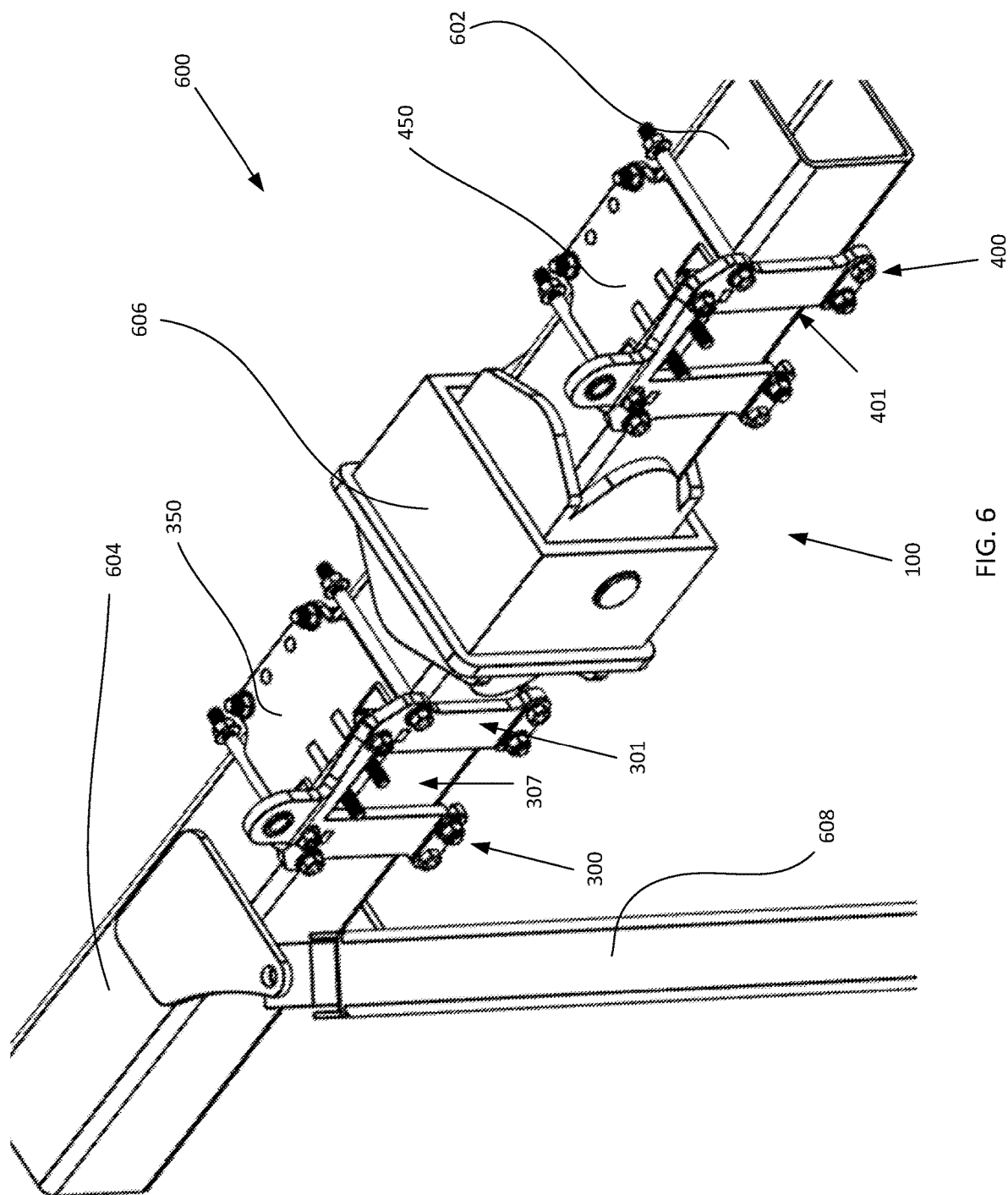
FIG. 6 provides a top perspective view of a first and a second removably installable bolt-on bracket for use in a removably installable bolt-on bracket system for weight transfer disposed on a row planter tool bar according to an embodiment of the present invention.

With reference now to FIG. 6, a top perspective view of a first 300 and a second 400 removably installable bolt-on bracket for use in a removably installable bolt-on bracket system 100 for weight transfer disposed on a row planter tool bar 600 according to an embodiment of the present invention is provided. The row planter tool bar 600 as shown comprises a first section 604 and a second section 602 with a connecting joint 606 which joins the two sections 602 and 604, and the row planter tool bar 600 is secured to a drawbar 608 which would be connected at an other end to a tractor or other suitable machinery. The connecting joint 606 is also the supported point for the bracket system 100. The primary plate 301 and top plate 350 of the first bracket 300 is positioned on but not fully secured to the first section 604, and the primary plate 401 and top plate 450 of the second bracket 400 is positioned on but not fully secured to the second section 602 on the other side of the connecting joint 606.

Figure 7:
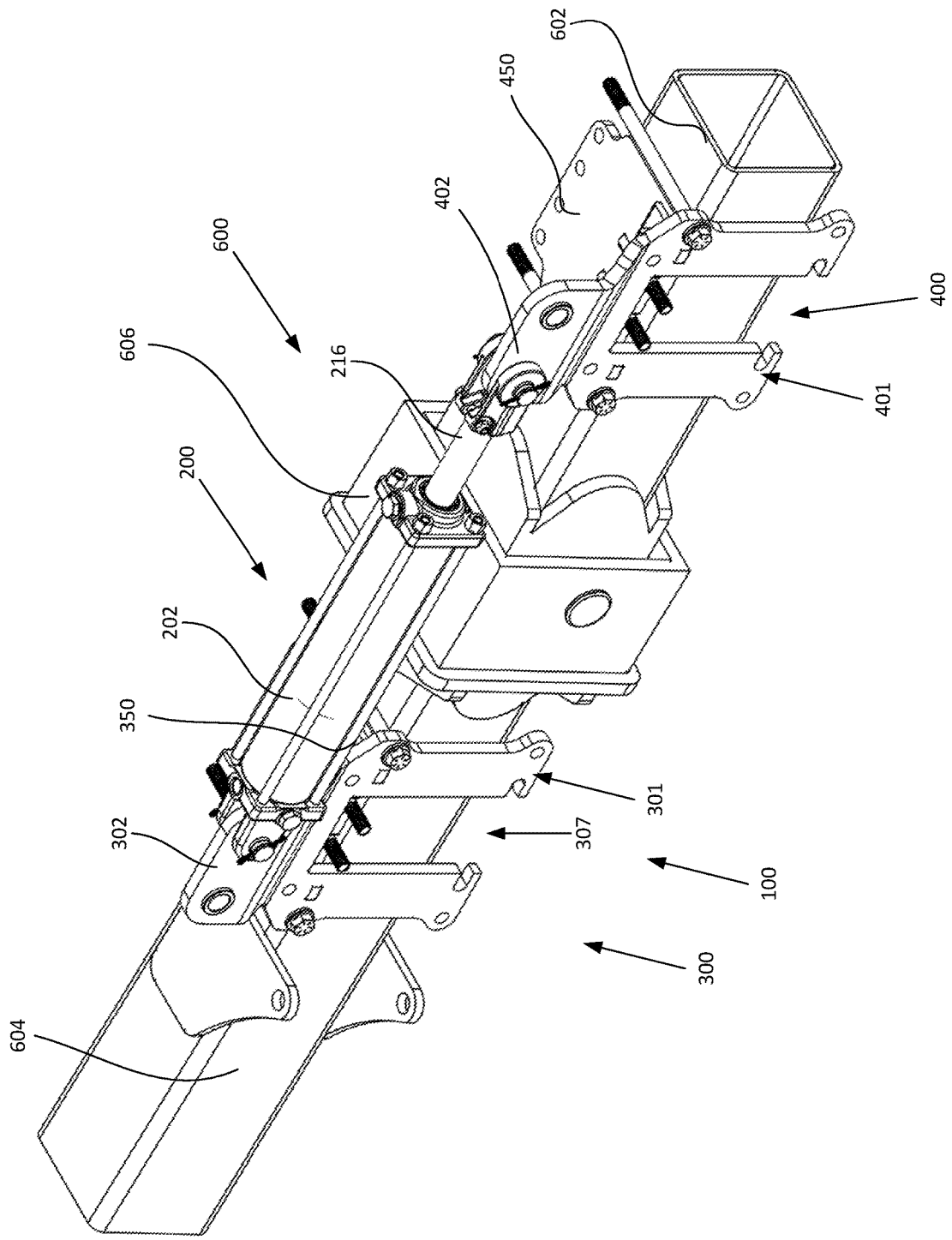
FIG. 7 provides a front perspective view of a first and a second removably installable bolt-on bracket and an actuator for use in a removably installable bolt-on bracket system for weight transfer disposed on a row planter tool bar according to an embodiment of the present invention.

In a fully installed configuration, the sets of fasteners 355 and 455 would secure the respective brackets 300 and 400 to the row planter tool bar 600. As shown in FIG. 7, which provides a front perspective view of the first 300 and second 400 removably installable bolt-on bracket and an actuator 200 disposed on the row planter tool bar 600, the actuator 200 is installed on and joins the top portions 302 and 402 of the respective first 300 and second 400 brackets.

At different levels of actuation, the piston arm or rod 216 will extend out further from, or retract into, the body 202 of the actuator 200 causing the distance between the top portion 302 and top portion 402 to increase or decrease. This change will cause the second portion 602 of the tool bar 600 to rotate about the connection joint 606 relative to the first portion 604. The distance, angle, or degree of rotation about the supported point of the connection joint 606 will cause any row planter equipment on the second portion 602 of the tool bar 600 to engage with the ground or soil to a greater or lesser amount depending on the direction of the change in angle. Adjusting the angle or position of the second portion 602 of the tool bar 600 is required to maintain a constant and consistent engagement of all row planter assemblies or equipment installed over the entire length of the tool bar 600. Installing the removably installable bolt-on bracket system for weight transfer 100 on the tool bar 600 provides for the adjustment of the angle of the different portions of the tool bar 600 relative to one another about the supported connection joint 606. The removably installable bolt-on bracket system for weight transfer 100 may be installed on a tool bar 600 without the use of welding and may be easily installed or removed at any time. Additionally, because the removably installable bolt-on bracket system for weight transfer 100 may be easily installed on and removed from the tool bar 600 its position may be changed at any time, and it may be removed for easy repairs or maintenance. The ease of installation, repair, maintenance, and remove of the removably installable bolt-on bracket system for weight transfer 100 is a substantial improvement over the permanently fixed or installed systems of the prior art.

Figure 8:
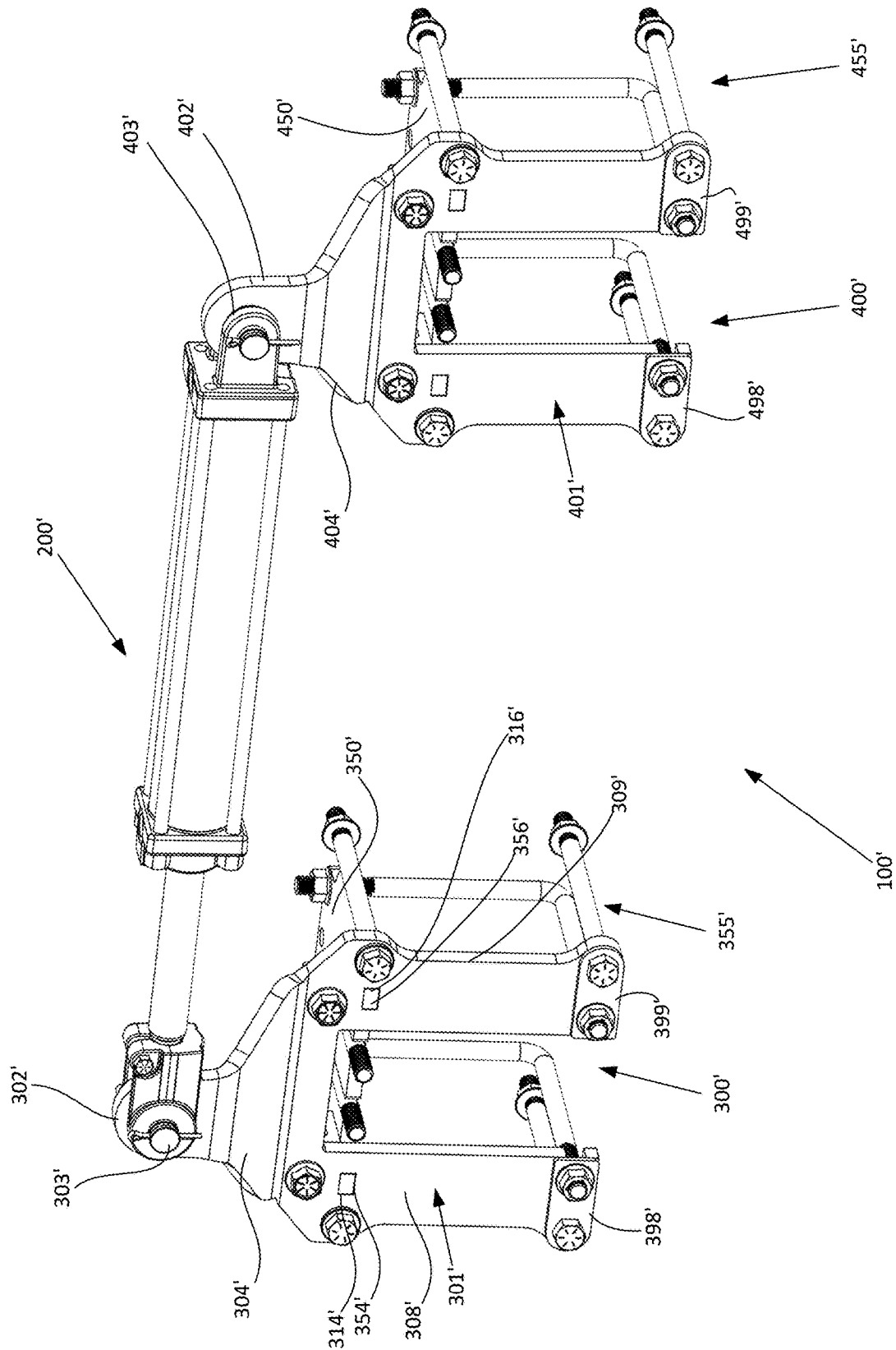
FIG. 8 provides a front perspective view of a removably installable bolt-on bracket system for weight transfer on a row planter tool bar according to an embodiment of the present invention.

With reference now to FIG. 8, a front perspective view of a removably installable bolt-on bracket system for weight transfer 100' on a row planter tool bar according to an embodiment of the present invention is provided. The bracket system 100' comprises a first or left bolt-on bracket assembly 300', a second or right bolt-on bracket assembly 400', an actuator assembly 200', a first set of fasteners 355', and a second set of fasteners 455'. The first 300' and second 400' bracket assemblies may be substantially similar or identical, comprising similar components in similar configurations providing for simpler manufacture, assembly, and installation on a row planter tool bar. As described herein, all elements of the first bolt-on bracket 300' may be present in the second bolt-on bracket 400' except as otherwise noted. Additionally, the bracket system 100' may be similar to the bracket system 100 shown in FIGS. 1-7; however, the top portion 302' comprises a single opening 303' and the top portion 402' comprises a single opening 403'. Additionally, the cut-outs 314' and 316' in the primary plate 301' are shaped to more closely fit about the tongues 354' and 356' with a smaller tolerance to provide additional support and better fitment between the primary plate 301' and 350', and the primary plate 401' and top plate 450' are similarly configured.

The first bolt-on bracket 300' comprises a primary plate 301' and a top plate 350'. The primary plate 301', in an installed configuration, is disposed on the front or face of a row planter tool bar and is oriented in a generally vertical configuration on a plane parallel to the face of the row planter tool bar. The top plate 350', in an installed configuration, is disposed on the top or upper surface of a row planter tool bar and is oriented in a generally horizontal configuration on a plane that is parallel to the top of the row planter tool bar and perpendicular to the primary plate 301'. A set of grooves or cut-outs 314' and 316' in the respective first arm 308' and second arm 309' are correspondingly shaped to a set of tongues or protrusions 354' and 356' of the top plate 350'. In an installed configuration, the tongues 354' and 356' fit into the respective cut-outs 314' and 316' to properly position the top plate 350' and to provide for mechanical support for the primary plate 301'.

The tongues and openings in the first and second bolt-brackets 300' and 400' enable the respective front plates 301' and 401' to be installed on a row planter unit such that the angled portions 304' and 404' may be angled away from the tool bar of a row planter unit. For example, the front plates 301' and 401' may be installed with either the front or back face abutting the tool bar such that the angled portions 304' and 404' may angle away from or over the tool bar. This provides for positioning the actuator 200' in different positions depending on the clearances needed on the row planter. The bolt-on bracket assembly 100 shown in FIGS. 1-7 may similarly be installed in either of these configurations. An opening 303' in the top portion 302' provides for the installation of one end of the actuator 200'. Additionally, reinforcement plates 398' and 399' for the assembly 300', and 498' and 499' for the assembly 400' may be used to provide additional structural integrity and security for the respective fasteners 355' and 455' and assist in locating and installing the brackets in the proper position.

Figure 10:
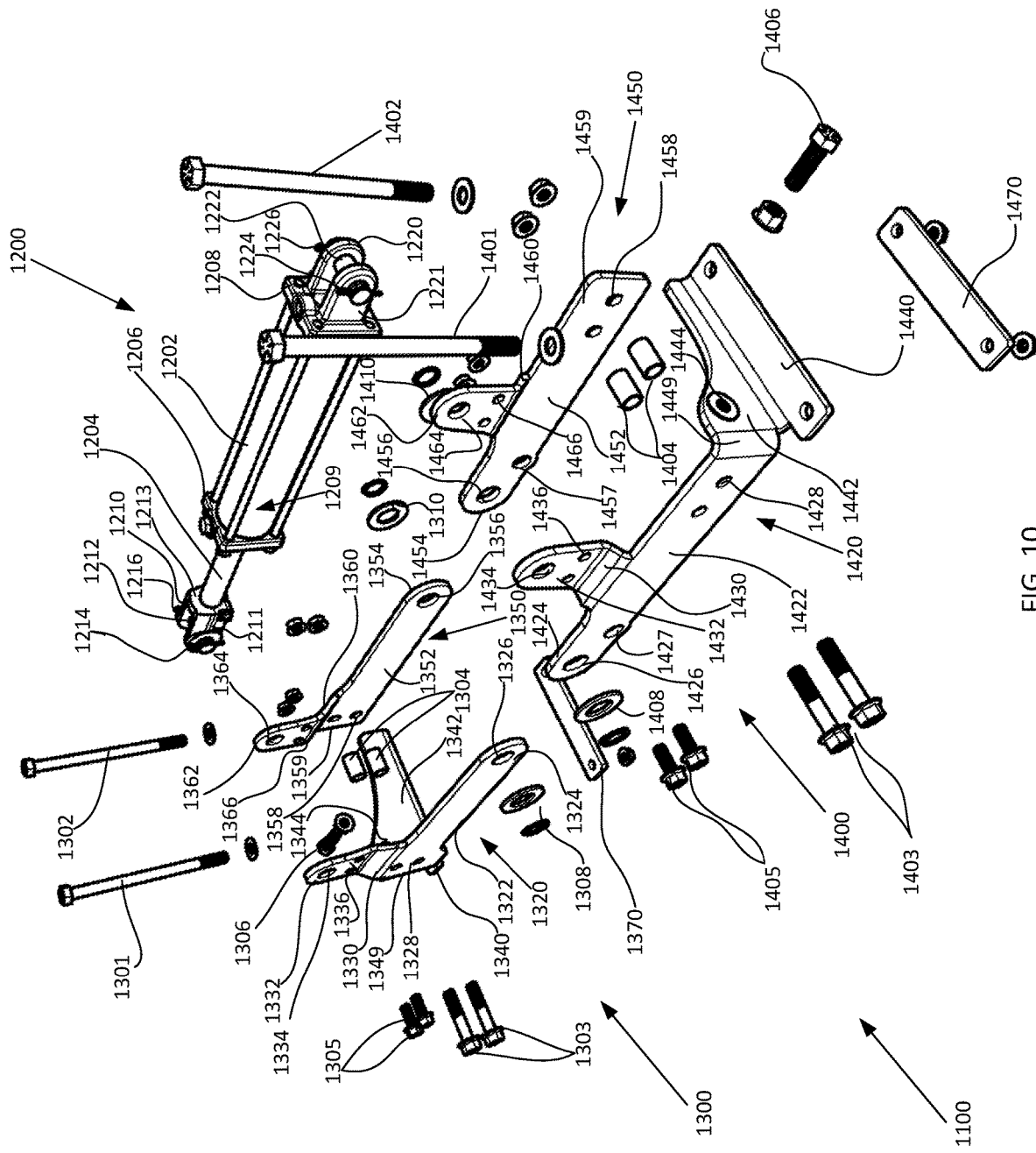
FIG. 10 provides an exploded top perspective view of a removably installable bolt-on bracket for use in a removably installable bolt-on bracket system for weight transfer on a row planter tool bar according to an embodiment of the present invention.

With reference now to FIG. 10, an exploded top perspective view of a removably installable bolt-on bracket 1100 for use in a removably installable bolt-on bracket system for weight transfer on a row planter tool bar according to an embodiment of the present invention is provided. The bracket system 1100 comprises a first or left bolt-on bracket assembly 1300 which may also be referred to as a left-hand wing bracket, a second or right bolt-on bracket assembly 1400 which may also be referred to as a right-hand wing bracket, and an actuator assembly 1200. The first 1300 and second 1400 bracket assemblies may be substantially similar or identical, comprising similar components in similar configurations providing for simpler manufacture, assembly, and installation on a row planter tool bar. However, in the embodiment as described herein and as shown in FIGS. 10-13, the configuration of the first bracket assembly 1300 and second bracket assembly 1400 differ to accommodate for installation on a particular tractor model. Specifically, in the embodiment shown in FIGS. 10-13, the first 1300 and second 1400 bracket assemblies are adapted to be installed on a JOHN DEERE model 1790 and 1795 planters without requiring modification of the planter row tool bars and further takes advantage of existing planter tool bar mounting points and pins.

The first bracket assembly 1300 comprises a primary bracket plate 1320 which may also be referred to as an outer wing bracket plate, and a secondary bracket plate 1350 which may also be referred to as an inner wing bracket plate. The primary bracket plate 1320 and secondary bracket plate 1350, when installed on a row planter tool bar, are adapted to be positioned on opposite sides (e.g., the front and rear sides) of an existing mounting point and on the top surface of the tool bar.

The primary bracket plate 1320 comprises an elongated main plate or body portion 1322 extending horizontally and generally in a vertical orientation having a first end 1326 with a pin opening 1324 and a second end 1349. A mating plate portion 1332 with a pivot pin opening 1334 and fastener openings 1336 extends up from the top of the main plate 1322 by an angled portion 1330. The mating plate portion 1332 is not in the same vertical plane as the main plate 1322 and is generally positioned inwardly from the main plate 1322. A rear plate portion 1342 is oriented perpendicular to the main plate 1322 and has an upper tool bar plate or flange 1340 in an orientation that would correspond to the upper surface of a row planter tool bar. Fastener opening 1344 corresponds to a mounting point on the row planter tool bar and the shape or contour of the rear plate portion 1342 is generally configured to not interfere with existing fixtures or mounting points on the row planter tool bar.

The secondary bracket plate 1350 comprises an elongated main plate or body portion 1352 extending horizontally and generally in a vertical orientation having a first end 1354 with a pin opening 1356 and a second end 1359. A mating plate portion 1362 with a pivot pin opening 1364 and fastener openings 1366 extends up from the top of the main plate 1352 by an angled portion 1360. The mating plate portion 1362 is not in the same vertical plane as the main plate 1352 and is generally positioned inwardly from the main plate 1352. The mating plate portion 1362 of the secondary bracket plate 1350 and the mating plate portion 1332 of the primary bracket plate 1320 abut one another when in an installed configuration on a row planter unit and provide a stable mounting point for the piston end 1213 of the actuator 1200. The mating plate portions 1332 and 1362 may be "jogged over" to the center of a toolbar to position the mounting point for the actuator 1200 at the center line of the tool bar. Additionally, the fastener openings 1336 and 1366 correspond to one another and the fastener openings 1328 and 1358 correspond to one another and each provides for a fastener, such as the respective upper fasteners 1305 and lower fasteners 1303, to pass through such that they may secure the primary 1320 and secondary 1350 plates together in an installed configuration. An additional rear fastener 1306 may further be used to locate and secure the primary plate 1320 relative to the secondary plate 1350. Specifically, the rear fastener 1306 may be used to adjust the position and the angle of the secondary plate 1350 by being either tightened or loosened in its installed position in the primary plate 1320. The rear fastener 1306 may be a jack bolt that is used to preload the secondary bracket plate 1350 to compensate for "wiggle" or looseness caused by normal manufacturing tolerances and to provide a stable point on which the force from the actuator 1200 may be transferred through the primary bracket plate 1320 to a tool bar.

Primary fasteners 1301 and 1302 may be used to secure the primary plate 1320 to the lower tool bar plate 1370. The lower tool bar plate 1370 is disposed beneath or on the bottom surface of the row planter tool bar and the clamping force provided by the primary fasteners 1301 and 1302 further secures the first bracket assembly 1300 in place. Additionally, these fasteners provide for the transfer of force or mechanical energy to the bottom side of the tool bar thereby further distributing the force and reducing the strain on the upper portion of the tool bar and on any mounting points on the upper portion of the tool bar. The lower tool bar plate 1370, which may also be referred to as a bottom strap, further acts to limit any rotational movement that may result in failure of the primary bracket plate 1320 caused by the force exerted by the actuator 1200 on the primary bracket plate 1320. This force is always an extending force caused by the actuator 1200 extending and forcing the first bracket assembly 1300 relatively down and out. The load is always a force acting straight down and is exerted on the top of a tool bar by the upper tool bar plate 1340 and on an existing pin in the tool bar through pin openings 1326 and 1356. The upper tool bar plate 1340 and lower tool bar plate 1370 also provide a clamping force on the tool bar via the primary fasteners 1301 and 1302 which further distributes the force from the actuator and prevents unwanted rotational movement.

Spacers, such as spacers 1304, may be used to provide support between the primary 1320 and secondary 1350 bracket plates when used with the corresponding fasteners 1303 as the primary 1320 and secondary plates do not abut at the rear 1349 and 1359 when in an installed configuration. Washers and c-clips 1308 and 1310 or other suitable fastening means may be used to secure the pins of the row planter tool bar and the limiting strap assemblies (as shown in FIGS. 3-4) when the primary 1320 and secondary 1350 plates are placed in an installed configuration.

The second bracket assembly 1400 comprises a primary bracket plate 1420 and a secondary bracket plate 1450. The primary bracket plate 1420 and secondary bracket plate 1450, when installed on a row planter tool bar, are adapted to be positioned on opposite sides (e.g., the front and rear sides) of an existing mounting point and on the top surface of the tool bar.

The primary bracket plate 1420 comprises an elongated main plate or body portion 1422 extending horizontally and generally in a vertical orientation having a first end 1424 with a pin opening 1426 and a second end 1449. A mating plate portion 1432 with a pivot pin opening 1434 and fastener openings 1436 extends up from the top of the main plate 1422 by an angled portion 1430. The mating plate portion 1432 is not in the same vertical plane as the main plate 1422 and is generally positioned inwardly from the main plate 1422 at about the middle of the main plate 1422. A rear plate portion 1442 is oriented perpendicular to the vertical plane of the main plate 1422 and has an upper tool bar plate or flange 1440 in an orientation that would correspond to the upper surface of a row planter tool bar. Fastener opening 1444 correspond to a mounting point on the row planter tool bar and the shape or contour of the rear plate portion 1442 is generally configured to not interfere with existing fixtures or mounting points on the row planter tool bar.

The secondary bracket plate 1450 comprises an elongated main plate or body portion 1452 extending horizontally and generally in a vertical orientation having a first end 1456 with a pin opening 1454 and a second end 1459. A mating plate portion 1462 with a pivot pin opening 1464 and fastener openings 1466 extends up from the top of the main plate 1452 by an angled portion 1460. The mating plate portion 1462 is not in the same vertical plane as the main plate 1452 and is generally positioned inwardly from the main plate 1452 at about the middle of the main plate 1452.

The mating plate portion 1462 of the secondary bracket plate 1450 and the mating plate portion 1432 of the primary bracket plate 1420 abut one another when in an installed configuration on a row planter unit and provide a stable mounting point for the cylinder end 1208 of the actuator 1200. The mating plate portions 1432 and 1462 may be "jogged over" to the center of a toolbar to position the mounting point for the actuator 1200 at the center line of the tool bar. Additionally, the fastener openings 1436 and 1466 correspond to one another and the fastener openings 1428 and 1458 correspond to one another and each provides for a fastener, such as the respective upper fasteners 1405 and lower fasteners 1403, to pass through such that they may secure the primary 1420 and secondary 1450 plates together in an installed configuration. An additional rear fastener 1406 may further be used to locate and secure the primary plate 1420 relative to the secondary plate 1450. Specifically, the rear fastener 1406 may be used to adjust the position and the angle of the secondary plate 1450 by being either tightened or loosened in its installed position in the primary plate 1420. The rear fastener 1406 may be a jack bolt that is used to preload the secondary bracket plate 1450 to compensate for "wiggle" or looseness caused by normal manufacturing tolerances and to provide a stable point on which the force from the actuator 1200 may be transferred through the primary bracket plate 1420 to a tool bar.

Primary fasteners 1401 and 1402 may be used to secure the primary plate 1420 to the lower tool bar plate 1470. The lower tool bar plate 1470 is disposed beneath or on the bottom surface of the row planter tool bar and the clamping force provided by the primary fasteners 1401 and 1402 further secures the second bracket assembly 1400 in place. Additionally, these fasteners provide for the transfer of force or mechanical energy to the bottom side of the tool bar thereby further distributing the force and reducing the strain on the upper portion of the tool bar and on any mounting points on the upper portion of the tool bar. The lower tool bar plate 1470, which may also be referred to as a bottom strap, further acts to limit any rotational movement that may result in failure of the primary bracket plate 1420 caused by the force exerted by the actuator 1200 on the primary bracket plate 1420. This force is always an extending force caused by the actuator 1200 extending and forcing the first bracket assembly 1400 relatively down and out. The load is always a force acting straight down and is exerted on the top of a tool bar by the upper tool bar plate 1440 and on an existing pin in the tool bar through pin openings 1426 and 1456. The upper tool bar plate 1440 and lower tool bar plate 1470 also provide a clamping force on the tool bar via the primary fasteners 1401 and 1402 which further distributes the force from the actuator and prevents unwanted rotational movement.

Figure 12:
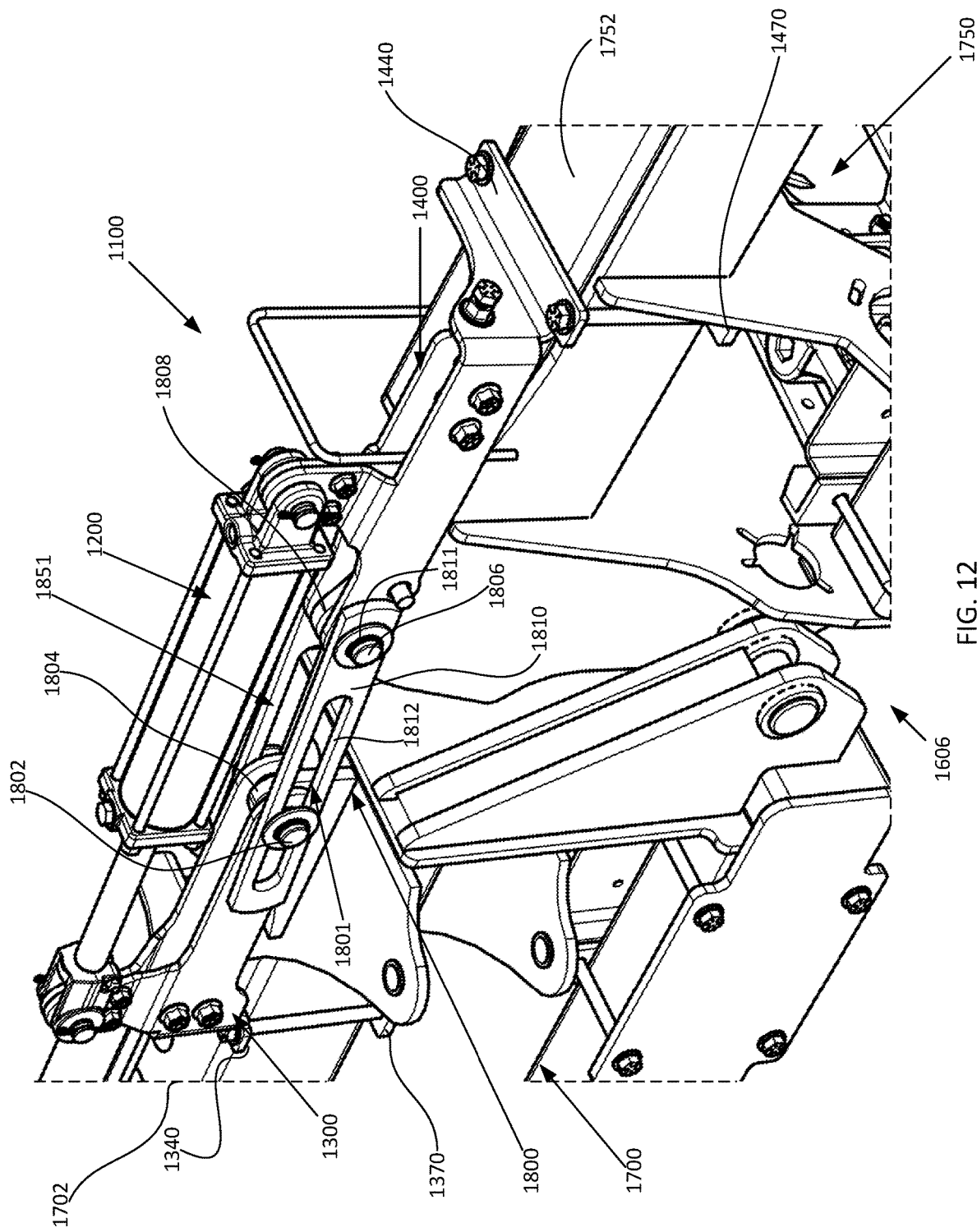
FIG. 12 provides a close-up, front perspective view of a first bracket assembly, second bracket assembly, and actuator of a removably installable bolt-on bracket system for weight transfer on a row planter tool bar having a first tool bar assembly and second tool bar assembly according to an embodiment of the present invention.
Figure 13:
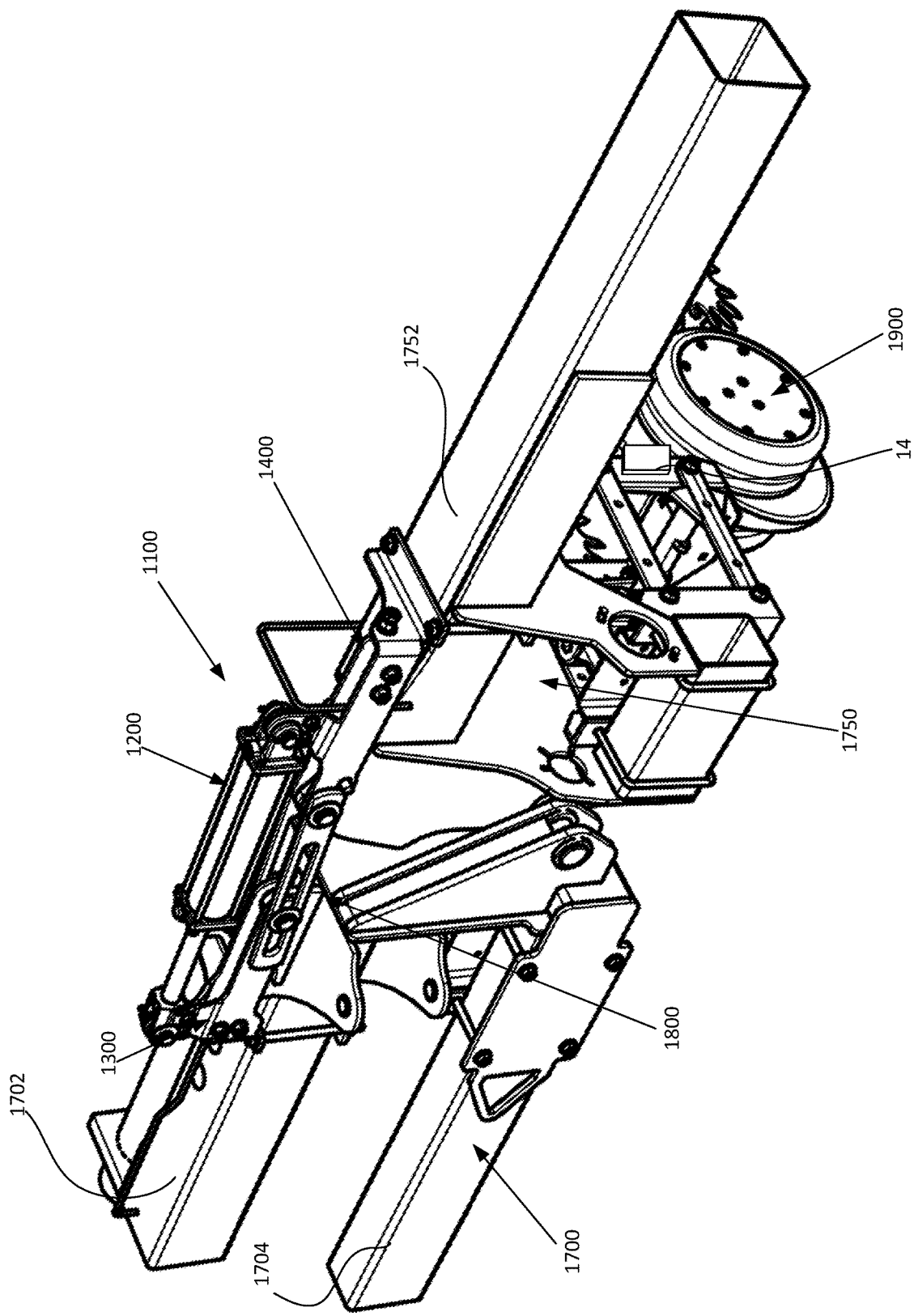
FIG. 13 provides a front perspective view of a first bracket assembly, second bracket assembly, and actuator of a removably installable bolt-on bracket system for weight transfer on a row planter tool bar having a first tool bar assembly and second tool bar assembly according to an embodiment of the present invention.

Spacers, such as spacers 1404, may be used to provide support between the primary 1420 and secondary 1450 bracket plates when used with the corresponding fasteners 1403 as the primary 1420 and secondary plates do not abut at the rear 1449 and 1459 when in an installed configuration. Washers and c-clips 1408 and 1410 or other suitable fastening means may be used to secure the pins of the row planter tool bar and the limiting strap assemblies (as shown in FIGS. 12-13) when the primary 1420 and secondary 1450 plates are placed in an installed configuration. The opening 1427 of the primary plate 1420 and opening 1457 of the secondary plate 1450 may be used to locate on additional existing pins or mounting points of the row planter tool bar.

The actuator 1200 may have a body 1202 which may be filled with a pneumatic or hydraulic fluid and may be a pneumatic type actuator such as a MARTIN SMART-CLEAN pneumatic actuator but may also be a suitable hydraulic or other actuator type. The actuator may be controlled by a system such as is described in U.S. patent application Ser. No. 15/690,269, entitled WIRELESS CONTROL SYSTEM FOR FLOATING ROW CLEANER, Martin, filed Aug. 29, 2017, which is incorporated by reference herein in its entirety. The actuator may also be an electronic or electro-mechanical actuator suitable for the weight transfer system application.

The actuator 1200 comprises a cylinder 1202 sealed at both ends 1206 and 1208 and in which is positioned a piston 1209 having a piston arm 1204. The actuator 1200 is secured at one end 1213 to the mating portions 1332 and 1362 of the first bracket assembly 1300 by a pivot pin 1212 that passes through openings in the arms 1211 and 1210 and is secured by cotter pins 1214 and 1216 or by other suitable securing means. The actuator 1200 is secured at an other end 1208 to the mating portions 1432 and 1462 by a pivot pin 1222 that passes through arms 1220 and 1221 and is secured by cotter pins 1224 and 1226 or other suitable securing means. The actuator 1200 may be a hydraulic or pneumatic cylinder or may be an electrical actuator. In the embodiment shown in FIG. 10, the actuator 1200 is a hydraulic actuator which would be connected to one or more hydraulic power supply lines at connection points at the end 1208. Varying hydraulic pressure from the supply lines would move the piston 1209 and piston arm 1204 in or out which would change the position of the first bracket assembly 1300 relative to the second bracket assembly 1400 about a supported point and would further move or change the relative angle of the respective tool bars or tool bar segments on which the first 1300 and second 1400 bracket assemblies are disposed.

The actuator 1200 used in the bracket system 1100 may be a PRINCE HYDRAULICS hydraulic cylinder with a part number B250140ABAAA07B having a 2.5" bore and a 14" stroke, or part number B300120ABAAA07B having a 3.0" bore and a 12" stroke. Additionally, the actuator 1200 is free to telescope in an out by means of a valve assembly that may be configured for different pounds per square inch ("PSI") settings. The valve assembly provides for the dumping of oil from the actuator 1200 when the wing tool bar moves upwards relative to the main tool bar, such as when the row planting units on the wing tool bar are moving over a hill or rise. Additionally, the valve assembly provides for oil to be rapidly pumped into the actuator when the when the wing tool bar moves down relative to the main tool bar, such as when the row planting units on the wing tool bar are moving down a hill or into a ditch or depression.

The fasteners used such as the primary fasteners 1301, 1302, 1401, 1402, upper fasteners 1305 and 1405, lower fasteners 1303 and 1403, and rear fasteners 1306 and 1406 may be flange bolts or hex bolts having fully or partially threaded shafts secured by nuts such as flanged nuts, locking nuts, or nuts and washers.

Figure 11:
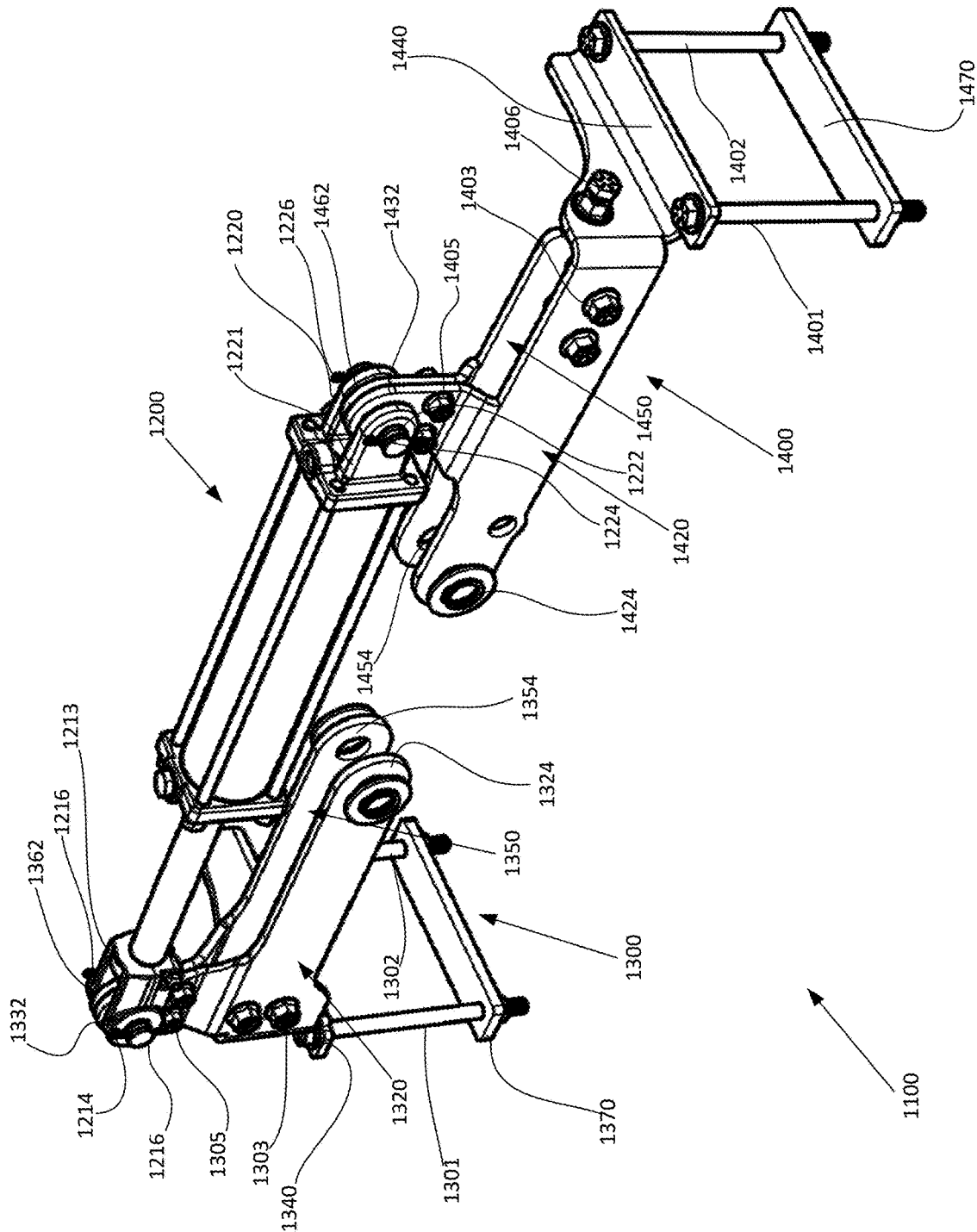
FIG. 11 provides a front perspective view of a removably installable bolt-on bracket system for weight transfer on a row planter tool bar according to an embodiment of the present invention.

With reference now to FIG. 11, a front perspective view of a removably installable bolt-on bracket system 1100 for weight transfer on a row planter tool bar according to an embodiment of the present invention is provided. In the view of the bracket system 1100 shown in FIG. 11, the fasteners, including the primary fasteners 1301, 1302, 1401, 1402, upper fasteners 1305 and 1405, lower fasteners 1303 and 1403, and rear fasteners 1306 and 1406, are shown located in their installed positions in their respective openings in the primary and secondary plates of the first 1300 and second 1400 bracket assemblies. The actuator 1200 is shown installed at the piston end 1213 to the mating portions 1332 and 1362 of the first bracket assembly 1300 by pivot pin 1212 secured by cotter pins 1212 and 1214 with arms 1210 and 1211 on disposed on the outer sides of the mating portions 1332 and 1362, and at the cylinder end 1208 to the mating portions 1432 and 1462 by pivot pin 1222 secured by cotter pins 1224 and 1226 with arms 1220 and 1221 on disposed on the outer sides of the mating portions 1432 and 1462. A tool bar would be disposed between the upper tool bar plates 1340 and 1440 and lower tool bar plates 1370 and 1470.

The removably installable bolt-on bracket system 1100 shown in FIGS. 10-13 is relatively more compact and takes up less space than alternative solutions. Additionally, the removably installable bolt-on bracket system 1100 may be installed on the tool bar and wing bar of a row planter without requiring the drilling or modification of any part of the tool bar, wing bar, or row planter. The removably installable bolt-on bracket system 1100 further takes advantage of existing mounting points and pins used by row planter pull arms or limiting straps to further distribute forces exerted by the actuator 1200, reducing the likelihood of fastener or bracket failure by distributing the force over as many points and as much surface area as possible.

With reference now to FIGS. 12-13, front perspective views of a first bracket assembly 1300, second bracket assembly 1400, and actuator 1200 of a removably installable bolt-on bracket system 1100 for weight transfer on a row planter tool bar having a first tool bar assembly 1700 and second tool bar 1750 assembly according to an embodiment of the present invention are provided. The first bracket assembly 1300 is located on the upper surface of an end of the tool bar 1702 of the tool bar assembly 1700 with the mounting flange 1804 located between the primary 1320 and secondary 1350 plates of the assembly 1300. The upper tool bar plate 1340 is on the upper surface of the tool bar 1702 and the lower tool bar plate 1370 is disposed on the lower surface of the tool bar 1702. The second bracket assembly 1400 is located on the upper surface of an end of the tool bar 1752 of the tool bar assembly 1750 with the mounting flange 1808 located between the primary 1420 and secondary 1450 plates of the assembly 1400. The upper tool bar plate 1440 is on the upper surface of the tool bar 1752 and the lower tool bar plate 1470 is disposed on the lower surface of the tool bar 1752. A limiting strap assembly 1800 comprises a first 1801 and a second limiting strap 1851. The second limiting strap 1851 has a configuration corresponding to the first limiting strap 1801. The first limiting strap 1801 has a main body 1810 comprising a first pin opening 1812 and a second pin opening 1811 corresponding to the first 1802 and the second 1806 pins on the respective row planter tool bars 1702 and 1752. The first pin opening 1812 of each of the first 1801 and the second 1851 limiting straps is larger than the first pin 1802 and permits the first pin 1802 to move in the first pin opening 1812. The limiting strap assembly 1800 permits movement and load distribution between the first 1300 and second 1400 bracket assemblies as provided by the actuator 1200.

Figure 14:
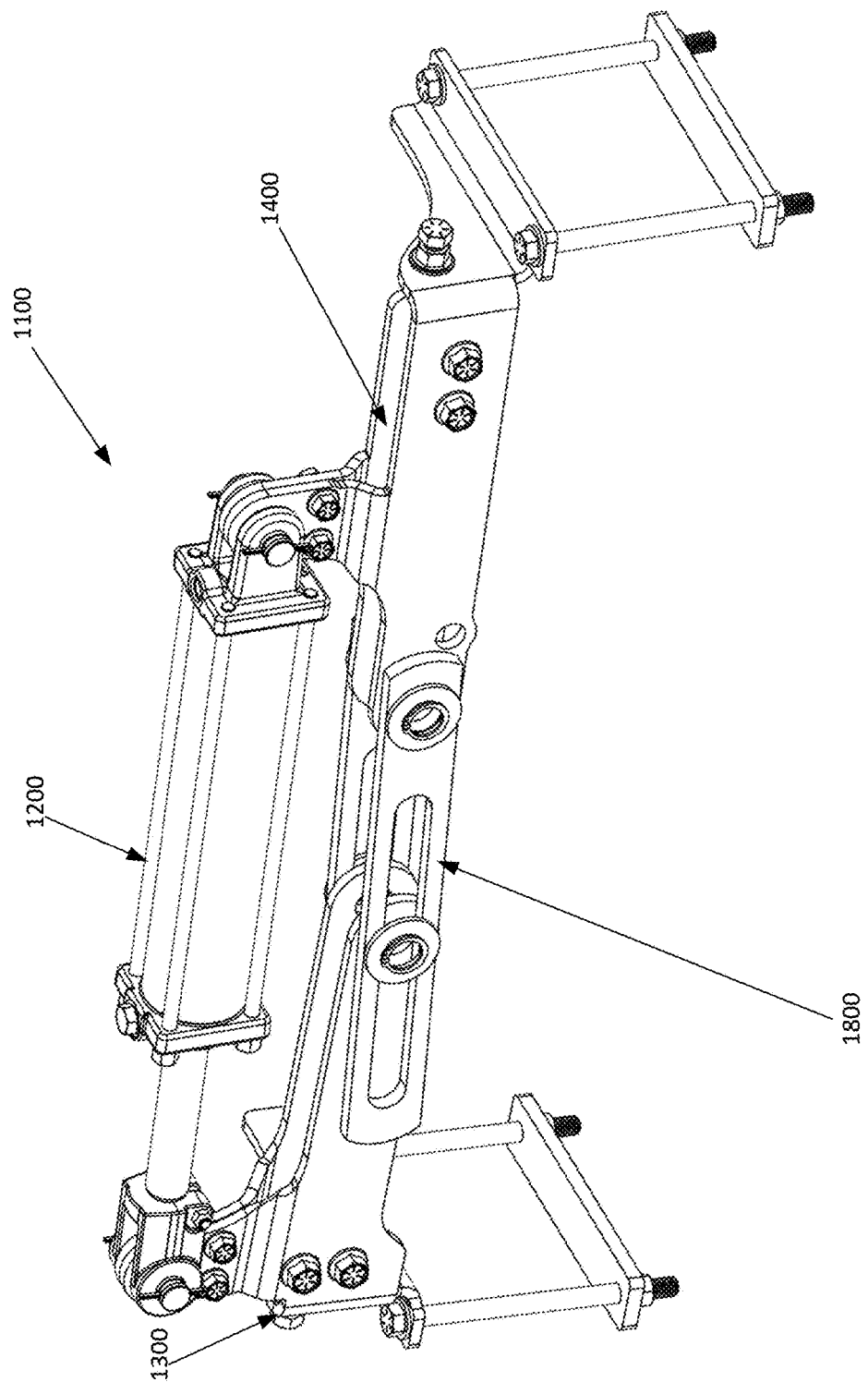
FIG. 14 provides a front perspective view of a first bracket assembly, second bracket assembly, and actuator of a removably installable bolt-on bracket system for weight transfer on a row planter tool bar having a first tool bar assembly and second tool bar assembly according to an embodiment of the present invention.

FIG. 14 illustrates the first bracket assembly 1300, second bracket assembly 1400, and actuator 1200 of the removably installable bolt-on bracket system 100 for weight transfer on a row planter tool bar with the limiting strap assembly 1800 not installed on a row planter or row planter tool-bar.

With reference to FIGS. 10-14, at different levels of actuation, the piston arm or rod 1204 will extend out further from, or retract into, the body 1202 of the actuator 1200 causing the distance between the top portion of the mating plates 1332 and 1362 and the top portion of the mating plates

1432 and 1462 to increase or decrease. This change will cause the second tool bar 1752 and second tool bar assembly 1750 to rotate or change angle relative to the first tool bar 1702 and lower tool bar 1704 of the first tool bar assembly 1700.

The change in distance, angle, or degree of rotation between the first tool bar 1702 and second tool bar 1752 will cause any row planter equipment such as row closing unit 1900 on the second tool bar 1752 of the tool bar assembly 1750 to engage with the ground or soil to a greater or lesser amount depending on the direction of the change in angle. Adjusting the angle or position of the second tool bar 1752 of the tool bar assembly 1750 is required to maintain a constant and consistent engagement of all row planter assemblies or equipment installed over the entire length of the first tool bar assembly 1700 and second tool bar assembly 1750.

Typically, every row planter unit or row closing unit 1900 requires approximately 1400 pounds of weight or pressure to be exerted on it to achieve optimal seed planting depth and soil engagement. A 7 inch by 7 inch square tool bar with steel that is ½ inches thick weighs approximately 1130 pounds and does not apply enough weight on a row planter unit for optimal soil engagement and planting. The problem compounds on longer tool and wing bars. The further the row planter unit is from the tractor, the less weight from the tractor and equipment is applied to the row planter unit. In order to have enough bar weight to transfer max down psi to the row planter unit, a 6-row wing would need to have a total weight of 2400 lbs. A 6-row wing unit does not come close to that amount of total weight. Approximately every 30 inches a removably installable bolt-on bracket system 1100 of the claimed invention could be installed on a tool bar or wing bar to apply the desirable amount of downforce or pressure on a row planter unit. The weight transfer system provided by the removably installable bolt-on bracket system 1100 has the capability to increase the weight of each wing by 1400 pounds measured at the end of a wing unit or tool bar, such as at a marker, or by 5500 pounds at 30 inches from the pivot. This amount of force is more than is required to keep the row planter units in the ground while alleviating pinch row compaction.

Installing the removably installable bolt-on bracket system for weight transfer 1100 on the tool bar assemblies 1700 and 1750 provides for the adjustment of the angle of the different portions of the first tool bar assembly 1700 and second tool bar assembly 1750 relative to one another about the supported connection joint 1606. The removably installable bolt-on bracket system for weight transfer 1100 may be installed on the tool bar assemblies 1700 and 1750 of a compatible row planter without the use of welding and may be easily installed or removed at any time. Additionally, because the removably installable bolt-on bracket system for weight transfer 1100 may be easily installed on and removed from the tool bars assemblies 1700 and 1750 its position may be changed at any time, and it may be removed for easy repairs or maintenance. The ease of installation, repair, maintenance, and remove of the removably installable bolt-on bracket system for weight transfer 1100 is a substantial improvement over the permanently fixed or installed systems of the prior art.

Figure 9:
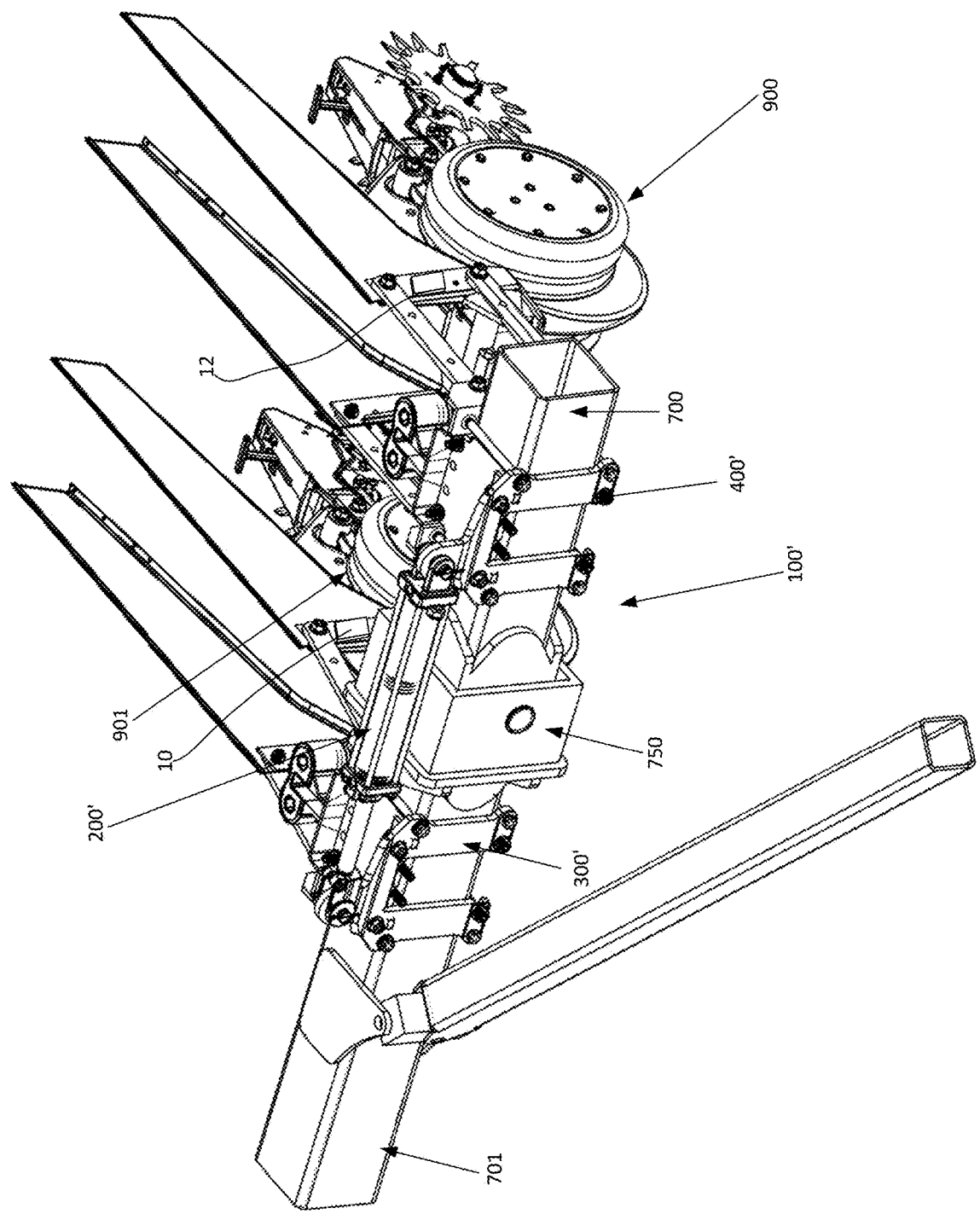
FIG. 9 provides a front perspective view of a first and a second removably installable bolt-on bracket and an actuator for use in a removably installable bolt-on bracket system for weight transfer disposed on a row planter tool bar according to an embodiment of the present invention.

With reference to FIGS. 9 and 13, additional features that may be used with any of the bracket systems 100, 100', or 1100 are described. Tilt, angle, or position sensors 10 and 12 (shown in FIG. 9) and 14 (shown in FIG. 13) may be installed on one or more row planter units (e.g., planter units 900, 901, and 1900) and be used in conjunction with any of the bracket systems 100, 100', or 1100. For example, as shown at FIG. 9, actuator 200' is operatively coupled with first and second tool bars 700 and 701 and connection joint 750, via first bolt-on bracket assembly 300' and second bolt-on bracket assembly 400' of bracket system 100'. The sensors 10, 12, and 14 are used to determine the angle or relative angle of the row planter unit on which they are installed. This measurement is compared to a measurement taken near the center of the row planter or near the tractor towing the system. The position or angle information collected by the sensor may be used to provide a control signal to a hydraulic control unit to set the pressure used to adjust the hydraulic actuator, such as actuator 200, 200', or 1200. In this manner, the position of the actuator 200, 200', or 1200 may be automatically or semi-automatically controlled by the determined position or angle of the row planter unit based on the data or signal from the sensor 10, 12, or 14. Any suitable angle or position sensor may be used to collect the angle or position information if properly calibrated and integrated with a hydraulic control system for the actuators 200, 200', or 1200. The sensors may be installed on any suitable portion of the row planter units 900, 901, or 1900, but in one embodiment may be installed on a parallel linkage for a row closing assembly. For example, the sensors may be installed to determine the angle of a wheel on any assembly on the row unit and that signal may be sent to a control unit to determine the pressure to be applied by the actuator.

In another embodiment, the sensors 10, 12, and 14 may be laser distance sensors or proximity sensors. In this configuration the sensors would determine a distance to the ground from the sensor and compare this measured distance to a measured distance by a sensor closer to the center of the row planter, such as near the tow bar or tractor. Based on a determined difference between these measurements, a signal may be sent to a control system for the actuators 200, 200', or 1200 to adjust the weight or pressure applied to the row planting units on the wings of the row planting system.

The length of actuation or the length of the actuator (e.g., actuators 200, 200', or 1200) may also be determined by a position sensor internal to the actuator or installed external to the actuator. As the length of actuation or length of the actuator gets longer and increases or gets shorter and decreases, it may be determined by a controller unit to send a signal to apply more pressure or less pressure as appropriate to the actuator to push down or lift up the tool bar. The sensors used with the system may be used with a suitable controller unit that may take as an input the output from the sensors and use that input to determine a control signal to be sent to one or more actuators to apply an appropriate down pressure to the toolbar and also the row units installed thereon. In this manner the pressure applied by the actuators may be controlled automatically.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

It should be noted that the present systems and/or methods are not limited to the specific embodiments described herein, but is intended to apply to all similar systems and/or methods for removing debris and/or providing a certain amount of tilling. Modifications and alterations from the described embodiments will occur to those skilled in the art without departure from the spirit and scope of the present systems and/or methods.

What is claimed is:

1. A removably installable row planter tool bar weight transfer system adapted to adjust weight transfer along a row planter tool bar by an actuator, the system comprising:
    a first bracket assembly configured to be removably mounted on a first portion of a row planter tool bar, the first bracket assembly comprising:
        a primary bracket plate;
        a secondary bracket plate;
        a lower tool bar plate;
        a first set of fasteners for securing the primary bracket plate to the secondary bracket plate and for securing the primary bracket plate and secondary bracket plate to the lower tool bar plate;
    a second bracket assembly adapted to be removably mounted to a second portion of the row planter tool bar, the second bracket assembly comprising:
        a primary bracket plate;
        a secondary bracket plate;
        a lower tool bar plate;
        a second set of fasteners for securing the primary bracket plate to the secondary bracket plate and for securing the primary bracket plate and secondary bracket plate to the lower tool bar plate;
    a mid plate assembly comprising a first and a second mid plate and being interconnected with the first and second bracket assemblies to facilitate transfer of force between the first and second bracket assemblies;
    an actuator operatively disposed and connected with the first and second tool bars by the first and second bracket assemblies; and
    wherein the first bracket assembly and the second bracket assembly when secured to the row planter tool bar are adapted to provide for the application of a force on the row planter tool bar by the actuator.

2. The weight transfer system of claim 1, wherein the primary bracket plate of the first bracket assembly further comprises:
    a main plate portion having a first end and a second end, the first end having a pin opening corresponding to a first pin on the row planter tool bar;
    a mating plate portion connected to the main plate portion by an angled portion and positioned at the second end of the main plate, the mating plate portion having a securement for securing an end of the actuator; and
    a rear plate portion connected and perpendicular to the main plate portion, the rear plate portion having an upper tool bar plate adapted to sit on an upper surface of the row planter tool bar.

3. The weight transfer system of claim 2, wherein the secondary bracket plate of the first bracket assembly further comprises:
    a main plate portion having a first end and a second end, the first end having a pin opening corresponding to the first pin on the row planter tool bar; and
    a mating plate portion connected to the main plate portion by an angled portion and positioned at the second end of the main plate, the mating plate portion having a securement for securing a first end of the actuator.

4. The weight transfer system of claim 1, wherein the lower tool bar plate of the first bracket assembly or the second bracket assembly is adapted to be positioned on a bottom surface of the row planter tool bar.

5. The weight transfer system of claim 1, wherein the primary bracket plate of the second bracket assembly further comprises:
    a main plate portion having a first end and a second end, the first end having a pin opening corresponding to a pin on the row planter tool bar;
    a mating plate portion connected to the main plate portion by an angled portion and positioned between the first end and the second end of the main plate, the mating plate portion having a securement for securing a second end of the actuator; and
    a rear plate portion connected and perpendicular to the main plate portion, the rear plate portion having an upper tool bar plate adapted to sit on the upper surface of the row planter tool bar.

6. The weight transfer system of claim 5, wherein the secondary bracket plate of the second bracket assembly further comprises:
    a main plate portion having a first end and a second end, the first end having a pin opening corresponding to the pin on the row planter tool bar; and
    a mating plate portion connected to the main plate portion by an angled portion and positioned between the first end and the second end of the main plate, the mating plate portion having a securement for securing an end of the actuator.

7. The weight transfer system of claim 1, wherein the mid plate assembly further comprises each of the first and the second mid plates having a first pin opening and a second pin opening corresponding to first and second pins on the row planter tool bar, wherein the first pin opening of each of the first and the second mid plates is larger than the first pin and permits the first pin to move in the first pin opening.

8. The weight transfer system of claim 1, wherein the actuator is a hydraulic actuator.

9. The weight transfer system of claim 1, wherein actuation of the actuator is based on a control signal from a controller and derived from an output of at least one sensor.

10. The weight transfer system of claim 1, wherein the mid plate assembly is configured as a limiting strap to limit the degree of angular displacement of the second tool bar portion relative to the first tool bar portion.

11. The weight transfer system of claim 1, wherein the first and second bracket assemblies are adapted to be removably installed, respectively, on the first and second tool bar portions without welding and resulting in non-weldment connections.

* * * * *